US009706462B2

United States Patent
Fang et al.

(10) Patent No.: US 9,706,462 B2
(45) Date of Patent: Jul. 11, 2017

(54) COMMUNICATION METHOD, USER EQUIPMENT, AND SINGLE RADIO CONTROLLER

(71) Applicant: HUAWEI TECHNOLOGIES CO., LTD., Shenzhen (CN)

(72) Inventors: Ming Fang, Shanghai (CN); Yanyan Chen, Shenzhen (CN); Bin Tan, Lima (PE); Pingping Xing, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/719,736

(22) Filed: May 22, 2015

(65) Prior Publication Data
US 2015/0257068 A1 Sep. 10, 2015

Related U.S. Application Data

(63) Continuation of application No. PCT/CN2012/085206, filed on Nov. 23, 2012.

(51) Int. Cl.
*H04W 36/14* (2009.01)
*H04W 24/10* (2009.01)
(Continued)

(52) U.S. Cl.
CPC .......... *H04W 36/14* (2013.01); *H04W 24/02* (2013.01); *H04W 24/10* (2013.01);
(Continued)

(58) Field of Classification Search
CPC . H04W 24/02; H04W 24/10; H04W 36/0022; H04W 48/16; H04W 8/08
(Continued)

(56) References Cited

U.S. PATENT DOCUMENTS

2009/0303966 A1* 12/2009 Cherian ............ H04W 36/0016
370/331
2010/0265914 A1* 10/2010 Song ..................... H04W 48/18
370/331
(Continued)

FOREIGN PATENT DOCUMENTS

CN 1607755 4/2005
CN 1859685 11/2006
(Continued)

OTHER PUBLICATIONS

Chinese Office Action and Search Report dated Jul. 22, 2015 in corresponding Chinese Patent Application No. 201280002184.4.
(Continued)

*Primary Examiner* — Inder Mehra
(74) *Attorney, Agent, or Firm* — Staas & Halsey LLP

(57) ABSTRACT

Embodiments of the present invention provide a communication method, a user equipment, and a single radio controller. The method includes: establishing, by a user equipment, a first connection with an SRC by using a first communications network; and sending, by the user equipment, NAS signaling or Layer 3 signaling of a second communications network to the SRC by using the first connection, and/or receiving NAS signaling or Layer 3 signaling of a second communications network from the SRC by using the first connection. Therefore, in the embodiments of the present invention, NAS/L3 signaling of a second communications network is transmitted over the first connection that is established in a first communications network, so that a service can flexibly switch between different RATs, and the system efficiency is improved.

20 Claims, 6 Drawing Sheets

(51) Int. Cl.
 *H04W 36/00* (2009.01)
 *H04W 40/02* (2009.01)
 *H04W 48/16* (2009.01)
 *H04W 8/08* (2009.01)
 *H04W 24/02* (2009.01)
 *H04W 92/20* (2009.01)

(52) U.S. Cl.
 CPC ....... *H04W 36/0022* (2013.01); *H04W 48/16* (2013.01); *H04W 92/20* (2013.01)

(58) Field of Classification Search
 USPC ................ 455/436, 456.5, 466; 379/112.04, 379/112.09; 370/112.04, 112.09, 114.14, 370/114.21, 114.24
 See application file for complete search history.

(56) References Cited

U.S. PATENT DOCUMENTS

| | | | | |
|---|---|---|---|---|
| 2011/0080867 | A1* | 4/2011 | Mildh | H04W 76/02 370/328 |
| 2011/0302139 | A1* | 12/2011 | Ueoka | G06F 17/30079 707/644 |
| 2012/0051328 | A1* | 3/2012 | Swaminathan | H04W 36/0016 370/332 |
| 2012/0115489 | A1* | 5/2012 | Shuai | H04W 36/14 455/438 |
| 2016/0088462 | A1* | 3/2016 | Jin | H04W 60/04 455/456.5 |

FOREIGN PATENT DOCUMENTS

| | | |
|---|---|---|
| CN | 101047948 | 10/2007 |
| CN | 101150594 | 3/2008 |
| CN | 101835241 | 9/2010 |
| CN | 102255892 | 11/2011 |
| EP | 2 187 674 A1 | 5/2010 |
| EP | 2 214 451 A1 | 8/2010 |

OTHER PUBLICATIONS

PCT International Search Report dated Sep. 5, 2013 in corresponding International Patent Application No. PCT/CN2012/085206.

"3$^{rd}$ Generation Partnership Project; Technical Specification Group Core Network and Terminals; Mobile radio interface Layer 3 specification; Core network protocols; Stage 3 (Release 11)", 3GPP TS 24.008 V11.4.0, Sep. 2012, pp. 1-672.

"3rd Generation Partnership Project; Technical Specification Group Core Network and Terminals; Non-Access-Stratum (NAS) protocol for Evolved Packet System (EPS); Stage 3 (Release 11)", 3GPP TS 24.301 V11.4.0, Sep. 2012, pp. 1-341.

"3rd Generation Partnership Project; Technical Specification Group Radio Access Network; Radio Resource Control (RRC); Protocol specification (Release 11)", 3GPP TS 25.331 V11.3.0, Sep. 2012, pp. 1-1981.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.1.0, Sep. 2012, pp. 1-325.

"3rd Generation Partnership Project; Technical Specification Group GSM/EDGE Radio Access Network; Mobile radio interface layer 3 specification; Radio Resource Control (RRC) protocol (Release 11)", 3GPP TS 44.018 V11.2.0, Sep. 2012, pp. 1-458.

3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 11), 3GPP TS 44.060 V11.2.1, pp. 1-627.

Extended European Search Report dated Dec. 21, 2015 in corresponding European Patent Application No. 12888748.6.

International Search Report mailed Sep. 5, 2013 in corresponding international application PCT/CN2012/085206.

* cited by examiner

COMMUNICATION METHOD, USER EQUIPMENT, AND SINGLE RADIO CONTROLLER

CROSS-REFERENCE TO RELATED APPLICATIONS

This application is a continuation of International Application No. PCT/CN2012/085206, filed on Nov. 23, 2012, which is hereby incorporated by reference in its entirety.

TECHNICAL FIELD

Embodiments of the present invention relate to the field of wireless communications, and in particular, to a communication method, a user equipment, and a single radio controller.

BACKGROUND

Air interfaces of communications networks have multiple RATs (radio access technologies) such as GSM (Global System for Mobile Communications), UMTS (Universal Mobile Telecommunications System), and LTE (Long Term Evolution, Long Term Evolution).

Communication between a UE (user equipment) and a network is closely related to an RAT used by an air interface of an access network. One access network of the GSM is GERAN (GSM/EDGE radio access network), one access network of the UMTS is UTRAN (UMTS terrestrial radio access network), and one access network of the LTE is E-UTRAN (evolved-UTRAN). Herein, the EDGE (enhanced data rate for GSM evolution) is an evolved technology of the GSM. The GSM is a 2G (second generation) mobile communications system, the UMTS is a 3G (third generation) mobile communications system, and the LTE is a 4G (fourth generation) mobile communications system.

L3 (Layer 3) signaling and NAS (non-access stratum) signaling in service setup, service running, and service releasing processes of a UE are all bound to the RAT of the air interface. For example, if the UE is registered with or location updated to an MSC (mobile switching center) of a GSM core network, signaling about registration/location update is all transmitted over a GSM air interface.

In this manner of binding the NAS signaling and the L3 signaling to the RAT of the air interface, the NAS signaling and the L3 signaling cannot flexibly use advantages of various air interfaces during setup of different types of services or during service running. For example, signaling cannot be flexibly transmitted according to factors such as load, leading to a long delay, low efficiency, and a high failure probability in service setup and running.

SUMMARY

Embodiments of the present invention provide a communication method, a user equipment, and a single radio controller, which can flexibly implement switching of a service between different RATs.

According to a first aspect, a communication method is provided, including: establishing, by a user equipment, a first connection with a single radio controller SRC by using a first communications network; and sending, by the user equipment, non-access stratum NAS signaling or Layer 3 signaling of a second communications network to the SRC by using the first connection, and/or receiving NAS signaling or Layer 3 signaling of a second communications network from the SRC by using the first connection, where the first communications network and the second communications network use different radio access technologies RATs, and the SRC is configured to manage radio resources of the first communications network and the second communications network.

With reference to the first aspect, in an implementation manner, the sending, by the user equipment, NAS signaling of a second communications network to the SRC by using the first connection includes: sending, by the user equipment, first NAS signaling of the second communications network to the SRC by using the first connection, where the first NAS signaling is used to register with or perform a location update to the second communications network.

With reference to the first aspect and the foregoing implementation manner of the first aspect, in another implementation manner, the first NAS signaling or a message or data that carries the first NAS signaling carries type information of the second communications network.

With reference to the first aspect and any one of the foregoing implementation manners of the first aspect, in another implementation manner, the receiving, by the user equipment, NAS signaling of a second communications network from the SRC by using the first connection includes: receiving, by the user equipment, second NAS signaling of the second communications network that is sent by the SRC by using the first connection, where the second NAS signaling is used to respond to the first NAS signaling or is NAS signaling that is initiated by the second communications network and related to registration or location update.

With reference to the first aspect and any one of the foregoing implementation manners of the first aspect, in another implementation manner, the sending, by the user equipment, NAS signaling of a second communications network to the SRC by using the first connection includes: sending, by the user equipment to the SRC by using the first connection, third NAS signaling for setting up a service in the second communications network.

With reference to the first aspect and the foregoing implementation manner of the first aspect, in another implementation manner, the third NAS signaling or a message or data that carries the third NAS signaling carries the type information of the second communications network.

With reference to the first aspect and the foregoing implementation manners of the first aspect, in another implementation manner, the receiving, by the user equipment, NAS signaling of a second communications network from the SRC by using the first connection includes: receiving, by the user equipment, fourth NAS signaling of the second communications network that is sent by the SRC by using the first connection, where the fourth NAS signaling is used to respond to the third NAS signaling or is NAS signaling initiated by the second communications network and related to service setup.

With reference to the first aspect and any one of the foregoing implementation manners of the first aspect, in another implementation manner, the receiving, by the user equipment, Layer 3 signaling of a second communications network from the SRC by using the first connection includes: receiving, by the user equipment, first Layer 3 signaling that is sent by the SRC by using the first connection, where the first Layer 3 signaling is used to transfer the user equipment to the second communications network; and the method further includes: establishing, by the user equipment, a second connection with the second communications network according to the first Layer 3 signaling, and executing a service over the second connection.

With reference to the first aspect and any one of the foregoing implementation manner of the first aspect, in another implementation manner, before the receiving, by the user equipment, first Layer 3 signaling, the receiving, by the user equipment, NAS signaling of a second communications network from the SRC by using the first connection includes: receiving, by the user equipment, alerting signaling that is sent by the SRC by using the first connection.

With reference to the first aspect and the foregoing implementation manner of the first aspect, in another implementation manner, the receiving, by the user equipment, NAS signaling of a second communications network from the SRC by using the first connection further includes: receiving, by the user equipment, fifth NAS signaling of the second communications network that is sent by the SRC by using the first connection, where the fifth NAS signaling is a connected message.

With reference to the first aspect and any one of the foregoing implementation manner of the first aspect, in another implementation manner, the sending, by the user equipment, NAS signaling of a second communications network to the SRC by using the first connection further includes: sending, by the user equipment, sixth NAS signaling to the SRC by using the first connection, where the sixth NAS signaling is used to acknowledge the connected message.

With reference to the first aspect and the foregoing implementation manners of the first aspect, in another implementation manner, the method further includes: measuring, by the user equipment, the second communications network, and generating a measurement report according to a result of the measurement; and sending, by the user equipment, the measurement report to the SRC by using the first connection.

With reference to the first aspect and any one of the foregoing implementation manners of the first aspect, in another implementation manner, the method further includes: sending, by the user equipment, capability indication information to the SRC, where the capability indication information is used to indicate that the user equipment has a cross-RAT signaling transmission capability.

With reference to the first aspect and any one of the foregoing implementation manners of the first aspect, in another implementation manner, the sending, by the user equipment, NAS signaling or Layer 3 signaling of a second communications network to the SRC by using the first connection includes: sending, by the user equipment, a signaling container to the SRC by using the first connection, where the signaling container carries the NAS signaling or the Layer 3 signaling of the second communications network; and the receiving, by the user equipment, NAS signaling or Layer 3 signaling of a second communications network from the SRC by using the first connection includes: receiving, by the user equipment, a signaling container from the SRC by using the first connection, where the signaling container carries the NAS signaling or the Layer 3 signaling of the second communications network.

With reference to the first aspect and any one of the foregoing implementation manners of the first aspect, in another implementation manner, the first connection is a control channel in the first communications network.

With reference to the first aspect and any one of the foregoing implementation manners of the first aspect, in another implementation manner, the second connection is a service channel in the second communications network.

According to a second aspect, a communication method is provided, including: establishing, by a single radio controller SRC, a first connection with a user equipment by using a first communications network; and sending, by the SRC, non-access stratum NAS signaling or Layer 3 signaling of a second communications network to the user equipment by using the first connection, and/or receiving NAS signaling or Layer 3 signaling of a second communications network from the user equipment by using the first connection, where the first communications network and the second communications network use different radio access technologies RATs, and the SRC is configured to manage radio resources of the first communications network and the second communications network.

With reference to the second aspect, in an implementation manner, the receiving, by the SRC, NAS signaling of a second communications network from the user equipment by using the first connection includes: receiving, by the SRC, first NAS signaling that is sent by the user equipment by using the first connection, where the first NAS signaling is used to register with or perform a location update to the second communications network; and the method further includes: forwarding the first NAS signaling to the second communications network.

With reference to the second aspect and the foregoing implementation manner of the second aspect, in another implementation manner, the first NAS signaling or a message or data that carries the first NAS signaling carries type information of the second communications network, and the method further includes: determining the second communications network according to the type information.

With reference to the second aspect and any one of the foregoing implementation manners of the second aspect, in another implementation manner, the method further includes: receiving, by the SRC, second NAS signaling sent by the second communications network, where the second NAS signaling is used to respond to the first NAS signaling or is NAS signaling that is initiated by the second communications network and related to registration or location update; and the sending, by the SRC, NAS signaling of a second communications network to the user equipment by using the first connection includes: sending, by the SRC, the second NAS signaling to the user equipment by using the first connection.

With reference to the second aspect and any one of the foregoing implementation manner of the second aspect, in another implementation manner, the method further includes: recording, by the SRC, an identifier of the user equipment, and information about the first communications network on which the user equipment camps and/or information about the second communications network with which the user equipment is registered.

With reference to the second aspect and any one of the foregoing implementation manners of the second aspect, in another implementation manner, the receiving, by the SRC, NAS signaling of a second communications network from the user equipment by using the first connection includes: receiving, by the SRC, third NAS signaling that is sent by the user equipment by using the first connection, where the third NAS signaling is used to set up a service in the second communications network; and the method further includes: forwarding the third NAS signaling to the second communications network.

With reference to the second aspect and any one of the foregoing implementation manner of the second aspect, in another implementation manner, the third NAS signaling or a message or data that carries the third NAS signaling carries the type information of the second communications network, and the method further includes: determining the second communications network according to the type information.

With reference to the second aspect and any one of the foregoing implementation manners of the second aspect, in another implementation manner, the method further includes: receiving, by the SRC, fourth NAS signaling sent by the second communications network, where the fourth NAS signaling is used to respond to the third NAS signaling or is NAS signaling initiated by the second communications network and related to service setup; and the sending, by the SRC, NAS signaling of a second communications network to the user equipment by using the first connection includes: sending, by the SRC, the fourth NAS signaling to the user equipment by using the first connection.

With reference to the second aspect and any one of the foregoing implementation manners of the second aspect, in another implementation manner, the method further includes: allocating, by the SRC, a service channel of the second communications network to the user equipment; and the sending, by the SRC, Layer 3 signaling of a second communications network to the user equipment by using the first connection includes: sending, by the SRC, first Layer 3 signaling to the user equipment by using the first connection, where the first Layer 3 signaling is used to transfer the user equipment to the service channel of the second communications network.

With reference to the second aspect and any one of the foregoing implementation manner of the second aspect, in another implementation manner, before the allocating, by the SRC, a service channel of the second communications network to the user equipment, the sending, by the SRC, NAS signaling of a second communications network to the user equipment by using the first connection further includes: sending, by the SRC, alerting signaling to the user equipment by using the first connection.

With reference to the second aspect and any one of the foregoing implementation manner of the second aspect, in another implementation manner, the sending, by the SRC, NAS signaling of a second communications network to the user equipment by using the first connection further includes: sending, by the SRC, fifth NAS signaling of the second communications network to the user equipment by using the first connection, where the fifth NAS signaling is a connected message.

With reference to the second aspect and any one of the foregoing implementation manner of the second aspect, in another implementation manner, the receiving, by the SRC, NAS signaling of a second communications network from the user equipment by using the first connection further includes: receiving, by the SRC, sixth NAS signaling that is sent by the user equipment by using the first connection, where the sixth NAS signaling is used to acknowledge the connected message of the second communications network.

With reference to the second aspect and any one of the foregoing implementation manners of the second aspect, in another implementation manner, the method further includes: sending, by the SRC, a measurement control message to the user equipment, where the measurement control message is used to instruct the user equipment to measure the second communications network; and receiving, by the SRC, a measurement report generated by the user equipment according to a result of the measurement.

With reference to the second aspect and any one of the foregoing implementation manners of the second aspect, in another implementation manner, the method further includes: receiving, by the SRC, capability indication information sent by the user equipment, where the capability indication information is used to indicate that the user equipment has a cross-RAT signaling transmission capability; and configuring, by the SRC, cross-RAT signaling transmission of the user equipment according to the capability indication information.

With reference to the second aspect and any one of the foregoing implementation manners of the second aspect, in another implementation manner, the method further includes: receiving, by the SRC, the NAS signaling or the Layer 3 signaling of the second communications network; and the sending, by the SRC, NAS signaling or Layer 3 signaling of a second communications network to the user equipment by using the first connection includes: filling, by the SRC, a signaling container with the NAS signaling or the Layer 3 signaling of the second communications network, and sending the signaling container to the user equipment by using the first connection.

With reference to the second aspect and any one of the foregoing implementation manners of the second aspect, in another implementation manner, the receiving, by the SRC, NAS signaling or Layer 3 signaling of a second communications network from the user equipment by using the first connection includes: receiving, by the SRC, the signaling container from the user equipment by using the first connection, where the signaling container carries the NAS signaling or the Layer 3 signaling of the second communications network; and the method further includes: extracting, by the SRC from the signaling container, the NAS signaling or the Layer 3 signaling of the second communications network, and sending the NAS signaling or the Layer 3 signaling of the second communications network to the second communications network.

With reference to the second aspect and any one of the foregoing implementation manners of the second aspect, in another implementation manner, the first connection is a control channel in the first communications network.

According to a third aspect, a user equipment is provided, including: a connection unit, configured to establish a first connection with a single radio controller SRC by using a first communications network; and a transceiver unit, configured to send non-access stratum NAS signaling or Layer 3 signaling of a second communications network to the SRC by using the first connection established by the connection unit, and/or receive non-access stratum NAS signaling or Layer 3 signaling of a second communications network from the SRC by using the first connection established by the connection unit, where the first communications network and the second communications network use different radio access technologies RATs, and the SRC is configured to manage radio resources of the first communications network and the second communications network.

With reference to the third aspect, in an implementation manner, the transceiver unit is specifically configured to send first NAS signaling of the second communications network to the SRC by using the first connection, where the first NAS signaling is used to register with or perform a location update to the second communications network.

With reference to the third aspect and the foregoing implementation manner of the third aspect, in another implementation manner, the transceiver unit is specifically configured to receive second NAS signaling of the second communications network that is sent by the SRC by using the first connection, where the second NAS signaling is used to respond to the first NAS signaling or is NAS signaling that is initiated by the second communications network and related to registration or location update.

With reference to the third aspect and any one of the foregoing implementation manners of the third aspect, in another implementation manner, the transceiver unit is specifically configured to send, to the SRC by using the first connection, third NAS signaling for setting up a service in the second communications network.

With reference to the third aspect and any one of the foregoing implementation manner of the third aspect, in another implementation manner, the transceiver unit is specifically configured to receive fourth NAS signaling of the second communications network that is sent by the SRC by using the first connection, where the fourth NAS signaling is used to respond to the third NAS signaling or is NAS signaling initiated by the second communications network and related to service setup.

With reference to the third aspect and any one of the foregoing implementation manners of the third aspect, in another implementation manner, the transceiver unit is specifically configured to receive first Layer 3 signaling that is sent by the SRC by using the first connection, where the first Layer 3 signaling is used to transfer the user equipment to the second communications network; and the connection unit is further configured to establish a second connection with the second communications network according to the first Layer 3 signaling, and execute a service over the second connection.

With reference to the third aspect and any one of the foregoing implementation manner of the third aspect, in another implementation manner, before the transceiver unit receives the first Layer 3 signaling, the transceiver unit is further configured to receive alerting signaling that is sent by the SRC by using the first connection.

With reference to the third aspect and any one of the foregoing implementation manner of the third aspect, in another implementation manner, the transceiver unit is specifically configured to receive fifth NAS signaling of the second communications network that is sent by the SRC by using the first connection, where the fifth NAS signaling is a connected message; and send sixth NAS signaling to the SRC by using the first connection, where the sixth NAS signaling is used to acknowledge the connected message.

With reference to the third aspect and any one of the foregoing implementation manners of the third aspect, in another implementation manner, the user equipment further includes: a measurement unit, configured to measure the second communications network, and generate a measurement report according to a result of the measurement; and the transceiver unit is further configured to send, to the SRC by using the first connection, the measurement report generated by the measurement unit.

With reference to the third aspect and any one of the foregoing implementation manners of the third aspect, in another implementation manner, the transceiver unit is further configured to send capability indication information to the SRC, where the capability indication information is used to indicate that the user equipment has a cross-RAT signaling transmission capability.

With reference to the third aspect and any one of the foregoing implementation manners of the third aspect, in another implementation manner, the transceiver unit is specifically configured to send a signaling container to the SRC by using the first connection, where the signaling container carries the NAS signaling or the Layer 3 signaling of the second communications network; or the transceiver unit is specifically configured to receive the signaling container from the SRC by using the first connection, where the signaling container carries the NAS signaling or the Layer 3 signaling of the second communications network.

According to a fourth aspect, a single radio controller is provided, including: a connection unit, configured to establish a first connection with a user equipment by using a first communications network; and a transceiver unit, configured to send non-access stratum NAS signaling or Layer 3 signaling of a second communications network to the user equipment by using the first connection established by the connection unit, and/or receive NAS signaling or Layer 3 signaling of a second communications network from the user equipment by using the first connection established by the connection unit, where the first communications network and the second communications network use different radio access technologies RATs, and the single radio controller is configured to manage radio resources of the first communications network and the second communications network.

With reference to the fourth aspect, in an implementation manner, the transceiver unit is specifically configured to receive first NAS signaling that is sent by the user equipment by using the first connection, where the first NAS signaling is used to register with or perform a location update to the second communications network; and the transceiver unit is further configured to forward the first NAS signaling to the second communications network.

With reference to the fourth aspect and any one of the foregoing implementation manner of the fourth aspect, in another implementation manner, the first NAS signaling or a message or data that carries the first NAS signaling carries type information of the second communications network; and the single radio controller further includes a determining unit, configured to determine the second communications network according to the type information.

With reference to the fourth aspect and any one of the foregoing implementation manners of the fourth aspect, in another implementation manner, the transceiver unit is further configured to receive second NAS signaling sent by the second communications network, where the second NAS signaling is used to respond to the first NAS signaling or is NAS signaling that is initiated by the second communications network and related to registration or location update; and send the second NAS signaling to the user equipment by using the first connection.

With reference to the fourth aspect and any one of the foregoing implementation manners of the fourth aspect, in another implementation manner, the transceiver unit is specifically configured to receive third NAS signaling that is sent by the user equipment by using the first connection, where the third NAS signaling is used to set up a service in the second communications network; and the transceiver unit is further configured to forward the third NAS signaling to the second communications network.

With reference to the fourth aspect and any one of the foregoing implementation manner of the fourth aspect, in another implementation manner, the third NAS signaling or a message or data that carries the third NAS signaling carries the type information of the second communications network; and the single radio controller further includes the determining unit, configured to determine the second communications network according to the type information.

With reference to the fourth aspect and any one of the foregoing implementation manners of the fourth aspect, in another implementation manner, the transceiver unit is further configured to receive fourth NAS signaling sent by the second communications network, where the fourth NAS signaling is used to respond to the third NAS signaling or is NAS signaling initiated by the second communications network and related to service setup; and send the fourth NAS signaling to the user equipment by using the first connection.

With reference to the fourth aspect and any one of the foregoing implementation manners of the fourth aspect, in another implementation manner, the single radio controller further includes an allocation unit, configured to allocate a service channel of the second communications network to the user equipment; and the transceiver unit is specifically configured to send first Layer 3 signaling to the user equipment by using the first connection, where the first Layer 3 signaling is used to transfer the user equipment to the service channel of the second communications network allocated by the allocation unit.

With reference to the fourth aspect and any one of the foregoing implementation manner of the fourth aspect, in another implementation manner, before the allocation unit allocates the service channel of the second communications network to the user equipment, the transceiver unit is specifically configured to send alerting signaling to the user equipment by using the first connection.

With reference to the fourth aspect and any one of the foregoing implementation manner of the fourth aspect, in another implementation manner, the transceiver unit is specifically configured to send fifth NAS signaling of the second communications network to the user equipment by using the first connection, where the fifth NAS signaling is a connected message; and receive sixth NAS signaling that is sent by the user equipment by using the first connection, where the sixth NAS signaling is used to acknowledge the connected message.

With reference to the fourth aspect and any one of the foregoing implementation manners of the fourth aspect, in another implementation manner, the transceiver unit is further configured to send a measurement control message to the user equipment, where the measurement control message is used to instruct the user equipment to measure the second communications network; and receive a measurement report generated by the user equipment according to a result of the measurement.

With reference to the fourth aspect and any one of the foregoing implementation manners of the fourth aspect, in another implementation manner, the transceiver unit is specifically configured to receive the NAS signaling or the Layer 3 signaling of the second communications network, and send a signaling container to the user equipment by using the first connection, where the signaling container carries the NAS signaling or the Layer 3 signaling of the second communications network; or the transceiver unit is specifically configured to receive the signaling container from the user equipment by using the first connection, where the signaling container carries the NAS signaling or the Layer 3 signaling of the second communications network; and send the NAS signaling or the Layer 3 signaling of the second communications network to the second communications network.

Therefore, in the embodiments of the present invention, NAS/L3 signaling of a second communications network is transmitted over a first connection that is established in a first communications network, so that a service can flexibly switch between different RATs, and the system efficiency is improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: global system for mobile communications (GSM), a code division multiple access (CDMA) system, wideband code division multiple access (WCDMA), general packet radio service (GPRS), and Long Term Evolution (LTE).

A user equipment (UE), also referred to as a mobile terminal (Mobile Terminal), a mobile station (Mobile Station), a mobile user equipment, or the like, may communicate with one or more core networks by using a radio access network (for example, RAN, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base station (Base Transceiver Station) in the GSM or CDMA, may also be a base station (NodeB) in the WCDMA, and may further be an evolved NodeB (eNB or e-NodeB, evolutional Node B) in the LTE, which is not limited in the present invention.

Figure 1:
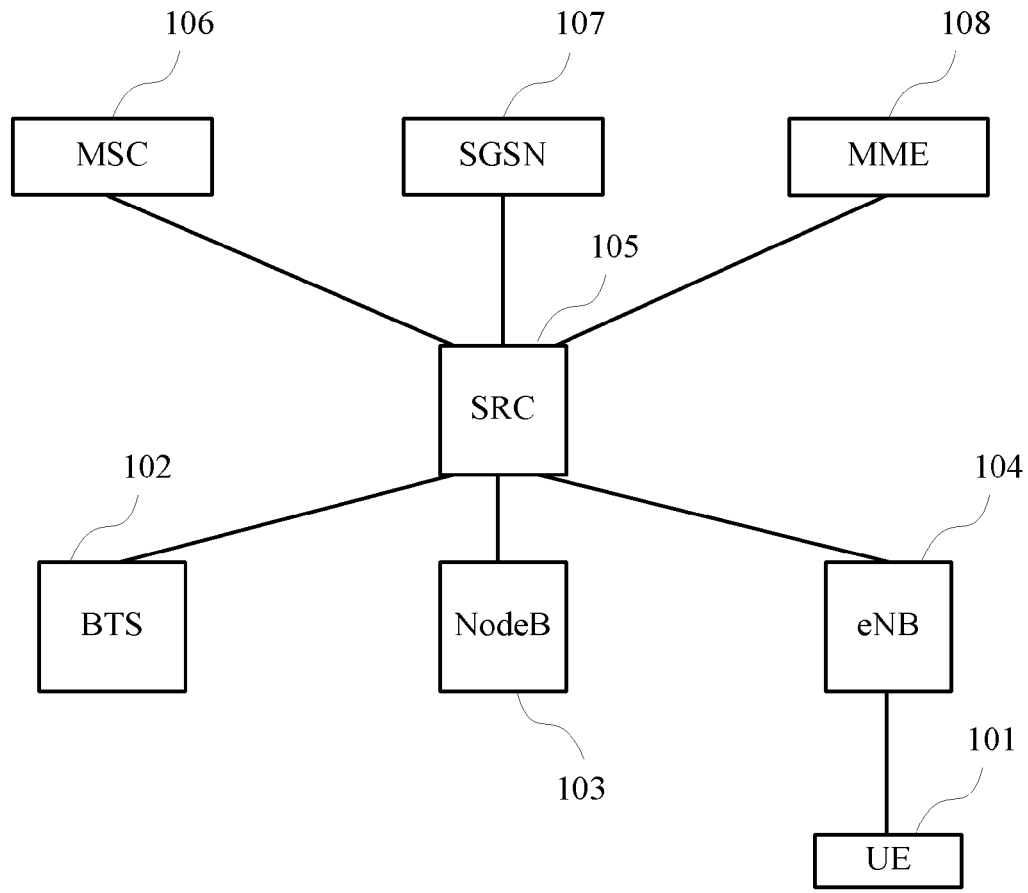
FIG. 1 is a schematic architectural diagram of a communications system to which embodiments of the present invention are applicable.

FIG. 1 is a schematic architectural diagram of a communications system to which embodiments of the present invention are applicable. It should be noted that the architectural diagram of FIG. 1 is only for the purpose of describing a scenario to which the embodiments of the present invention are applicable, and is not intended to limit the scope of the embodiments of the present invention. The embodiments of the present invention may be applied to other multi-RAT communications systems, where these RATs may be RATs stipulated in the 3GPP, or may also be other RATs.

As shown in FIG. 1, a BTS 102 is a base station in a GSM system, a NodeB 103 is a base station in a UMTS system, and an eNB 104 is a base station in an LTE system. In the following embodiments, a scenario in which a UE 101 camps on the eNB 104 of the LTE system and exchanges NAS/L3 signaling related to an MSC 106 with an SRC (Single Radio Controller, single radio controller) 105 is used as an example for description, but the embodiments of the present invention do not limit the application scenario.

The so-called camping refers to that the UE 101 listens on logical channels that are sent by the eNB 104 and need to be listened on when the UE is in an idle (idle) state, such as a BCCH (broadcasting control channel) and a CCCH (common control channel). The BCCH/CCCH may also be separately configured on a frequency. The UE 101 establishes an air interface connection with the LTE system according to BCCH/CCCH information sent by the eNB 104.

The SRC 105 is configured to manage a radio resource of a communications network of each RAT. The scenario of FIG. 1 is used as an example, where the SRC 105 is connected to the base stations, namely, the BTS 102, the NodeB 103, and the eNB 104, and therefore manages the radio resource of each communications network.

The SRC 105 is also connected to core network devices: an MSC 106, an SGSN (serving GPRS support node) 107, and an MME (mobility management entity) 108. The MSC 106 is a device that is in a 2G or 3G network and configured to control services of all BSCs (Base Station Controller, base station controller), control a mobile terminal to initiate or terminate a user call, and provide an exchange function and connections of other functions in the system. The SGSN 107 is a mobile management device in a 2G or 3G network, and is configured to record current location information of a mobile terminal; and send and receive mobile packet data between the mobile terminal and the SGSN. The MME 108 is a mobile management device in a 4G network, and is configured to perform control, such as mobility management and bearer management, over a mobile terminal.

For the purpose of brevity, different MSCs in 2G and 3G networks are not distinguished in FIG. 1, but are collectively referred to as the MSC 106; however, a person skilled in the art can understand that the MSC 106 may include multiple MSC devices in different RATs. Similarly, different SGSNs in 2G and 3G networks are not distinguished in FIG. 1, but are collectively referred to as the SGSN 107; however, a person skilled in the art can understand that the SGSN 107 may include multiple SGSN devices in different RATs.

It should be noted that although FIG. 1 describes network architectures of three RATs, a quantity of RATs is not limited in the embodiments of the present invention, and may also be, for example, two or more than three.

In addition, although FIG. 1 describes the SRC as an independent device, an implementation manner of the SRC is not limited in the embodiments of the present invention; and the SRC may also be located on the BTS 102, the NodeB 103, the eNB 104, the MSC 106, the SGSN 107, or the MME 108, or may be located on another network device, or may be implemented on different network devices in a distributed manner.

Figure 2:
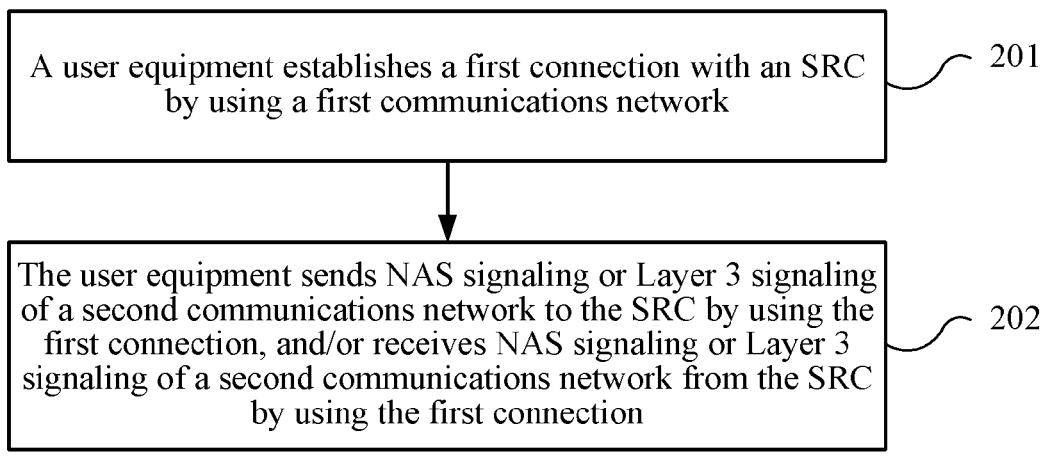
FIG. 2 is a flowchart of a communication method according to an embodiment of the present invention.

FIG. 2 is a flowchart of a communication method according to an embodiment of the present invention. The method of FIG. 2 is executed by a user equipment, and is executed by, for example, the UE 101 shown in FIG. 1.

201: The user equipment establishes a first connection with an SRC by using a first communications network.

The scenario in FIG. 1 is used as an example. The UE 101 may establish a first connection with the SRC 105 by using an LTE network in which the eNB 104 is located. The first connection may be an RRC (radio resource control) connection, or may be a control channel in the first communications network. The first connection may include an air interface connection between the UE 101 and the eNB 104 and a wired connection between the eNB 104 and the SRC 105.

202: The user equipment sends NAS signaling or Layer 3 signaling of a second communications network to the SRC by using the first connection, and/or receives NAS signaling or Layer 3 signaling of a second communications network from the SRC by using the first connection.

The first communications network and the second communications network use different RATs, and the SRC is configured to manage radio resources of the first communications network and the second communications network.

For example, in the scenario of FIG. 1, the UE 101 may exchange NAS/L3 signaling of another communications network with the SRC 105 by using the first connection that is established in an LTE system in step 201, and may exchange, for example, NAS/L3 signaling related to the MSC 106 (which belongs to a GSM system or a UMTS system). Such exchange of signaling may be referred to as cross-RAT signaling interworking.

Optionally, the cross-RAT signaling interworking may be implemented by unbinding NAS/L3 signaling from an RAT of an air interface. The unbinding may be implemented by decoupling an AS (access stratum) from a NAS, that is, NAS/L3 signaling of a second communications network may be transmitted by using an air interface resource of a first communications network.

Therefore, in this embodiment of the present invention, NAS/L3 signaling of a second communications network is transmitted over a first connection established in a first communications network, so that a service can flexibly switch between different RATs, and the system efficiency is improved.

For example, the UE may implement cross-RAT registration or location update in the cross-RAT signaling interworking manner according to this embodiment of the present invention, that is, register with or perform a location update to the second communications network by using the first communications network.

As an embodiment, in step 202, the user equipment may send first NAS signaling of the second communications network to the SRC by using the first connection, where the first NAS signaling is used to register with or perform a location update to the second communications network.

According to different target core networks for location update, the location update may include performing update in a location area of the MSC 106, performing update in a routing area of the SGSN 107, performing update in a tracking area of the MME 108, or performing update in a mobility management area of another core network device.

According to different target core networks for registration, the registration may include registration with the MSC 106, registration with the SGSN 107, registration with the MME 108, or registration with another core network device.

An existing NAS message, for example, a message stipulated in the 3GPP TS24.008 or TS24.301 protocol, may be used as the NAS signaling in this embodiment of the present invention, but a specific form of the NAS signaling is not limited in this embodiment of the present invention, and is neither limited to NAS signaling of 2G/3G/LTE nor limited to NAS signaling of a CS (circuit switched) domain or a PS (packet switched) domain.

The first NAS signaling or a message or data that carries the first NAS signaling may carry indication information for indicating that the UE intends to register or perform a location update. Optionally, as another embodiment, the first NAS signaling or a message or data that carries the first NAS signaling may further carry type information of the second communications network. In this way, the SRC can conveniently determine, according to the type information of the second communications network, an object with which the UE intends to register or to which the UE intends to update the location. The indication information and the type information may be carried in the first NAS signaling, for example, in a payload (payload) of NAS signaling; or may be carried in the message or the data that carries the first NAS signaling, for example, in a UL Information Transfer (uplink information transfer) message including a registration request.

The type information may be explicit, and explicitly indicates a specific network element such as the MSC 106, the SGSN 107, or the MME 108; or may be implicit, and the SRC determines how to forward the first NAS signaling according to a type of the first NAS signaling (that is, whether the first NAS signaling is a NAS message of a 2G MSC, or a NAS message of a 3G MSC, or a NAS message of another RAT core network).

As a non-limiting example, 2-bit type information is used as an example, where "000" may be used to represent a 2G MSC, "001" may be used to represent a 3G MSC, "010" may be used to represent a 2G SGSN, "011" may be used to represent a 3G SGSN, "100" may be used to represent an MME, and "101" to "111" are used as reserved bits (reserved).

Optionally, as another embodiment, in step 202, the user equipment may receive second NAS signaling of the second communications network that is sent by the SRC by using the first connection, where the second NAS signaling is used to respond to the first NAS signaling or is NAS signaling that is initiated by the second communications network and related to registration or location update.

For example, in addition to the NAS signaling for registration or location update and the corresponding NAS signaling serving as a response, other NAS signaling such as NAS signaling related to authentication (Authentication) and a ciphering mode (Ciphering mode) may further need to be exchanged between a core network of the second communications network and the UE; and with reference to the first NAS signaling and the second NAS signaling, similarly, an interworking manner of these NAS signaling is also implemented by using an air interface connection in the first communications network.

For another example, the UE may implement a cross-RAT service such as a CS service or a PS service in the cross-RAT signaling interworking manner according to this embodiment of the present invention, that is, initiate a call or packet service in the second communications network by using the first communications network.

As an embodiment, in step 202, the user equipment may send, to the SRC by using the first connection, third NAS signaling for setting up a service in the second communications network. The third NAS signaling may be used to set up a call service or a packet service, and a specific service type is not limited in this embodiment of the present invention.

Optionally, as another embodiment, the third NAS signaling or a message or data that carries the third NAS signaling carries the type information of the second communications network. The type information may be the same as the type information carried in the first NAS signaling or the message or the data that carries the first NAS signaling described above, and therefore is not described in detail again.

Optionally, as another embodiment, in step 202, the user equipment may receive fourth NAS signaling of the second communications network that is sent by the SRC by using the first connection, where the fourth NAS signaling is used to respond to the third NAS signaling or is NAS signaling initiated by the second communications network and related to service setup.

Optionally, as another embodiment, the user equipment may receive first Layer 3 signaling that is sent by the SRC by using the first connection, where the first Layer 3 signaling is used to transfer the user equipment to the second communications network. For example, the SRC may allocate a service channel of the second communications network to the user equipment, so that the user equipment may execute a service on the service channel of the second communications network. In this case, the user equipment may establish a second connection with the second communications network according to the first Layer 3 signaling, and execute a service over the second connection, where the second connection may be a service channel in the second communications network. In addition, optionally, the first Layer 3 signaling may be corresponding signaling in the first communications network.

Specifically, two methods may be used to transfer the user equipment to the second communications network. In one method, a Layer 3 message used in the first communications network (for example, a handover command in the first communications network) is sent, and in the other method, a Layer 3 message in the second communications network (for example, an assignment command in the second communications network) is used. If the Layer 3 message in the second communications network is used, the L3 message may be sent to the user equipment by using a container, for example, the container is placed in an RRC connection reconfiguration (RRC connection reconfigure) message of the first communications network. After receiving the container, the user equipment extracts the L3 message from the container, delivers the L3 message to a Layer 3 protocol stack of the second communications network for parsing, and performs a call service over the service channel of the second communications network according to an instruction of the message.

The first Layer 3 signaling may be an assignment command (assignment command), a reconfiguration command (RRC reconfigure), a handover command (handover command), or the like; and a specific form of the first Layer 3 signaling is not limited in this embodiment of the present invention.

The L3 signaling of this embodiment of the present invention includes an existing L3 message, and may also include an RRC-related message such as a message stipulated in the 3GPP 44.018, 44.060, 25.331, or 36.331 protocol. However, a specific form of the L3 signaling is not limited in this embodiment of the present invention, and is neither limited to L3 signaling of 2G/3G/LTE nor limited to L3 signaling of a CS domain or a PS domain.

Optionally, as another embodiment, before the user equipment receives the first Layer 3 signaling, the user equipment may receive alerting (altering) signaling that is sent by the SRC by using the first connection. The alerting signaling is also a type of NAS signaling. In addition, the alerting signaling may also be transmitted on a CS service channel of the second communications network in an existing manner.

Optionally, as another embodiment, the user equipment may receive fifth NAS signaling of the second communications network that is sent by the SRC by using the first connection, where the fifth NAS signaling is a connected (connected) message. The connected message is used to indicate that a called party accepts the current call. In this case, the user equipment may send sixth NAS signaling to the SRC by using the first connection, where the sixth NAS signaling is used to acknowledge the connected message (connected ack). In addition, the connected message and the connected ack message may also be transmitted on a CS service channel of the second communications network in an existing manner.

Optionally, as another embodiment, the user equipment may measure the second communications network, and generate a measurement report according to a result of the measurement; and then send the measurement report to the SRC by using the first connection. In this case, the SRC may allocate a service channel of the second communications network according to the measurement report.

Optionally, as another embodiment, the user equipment may send capability indication information to the SRC, where the capability indication information is used to indicate that the user equipment has a cross-RAT signaling transmission capability.

The capability indication information may be reported to the SRC during establishment of the first connection, or may be reported after the first connection is established, for example, may be reported during a NAS registration or location update process.

Optionally, as another embodiment, the foregoing cross-RAT signaling interworking may be implemented by using a signaling container (container). For example, the user equipment may send a signaling container to the SRC by using the first connection, where the signaling container carries the NAS signaling or the Layer 3 signaling of the second communications network; or the user equipment may receive the signaling container from the SRC by using the first connection, where the signaling container carries the NAS signaling or the Layer 3 signaling of the second communications network.

In the following specific embodiment, the signaling container manner is used as an example for description, but this embodiment of the present invention does not set any limitation on a specific form of a message or data that carries the cross-RAT NAS/L3 signaling.

Therefore, in this embodiment of the present invention, NAS/L3 signaling of a second communications network is transmitted over a first connection that is established in a first communications network, so that a service can flexibly switch between different RATs, and the system efficiency is improved.

This embodiment of the present invention can fully utilize advantages of air interfaces of different RATs. For example, an E-UTRAN air interface has an advantage of a low delay. If the E-UTRAN air interface is used as a physical bearer to carry NAS signaling for setting up a CS call in the GERAN/UTRAN, the advantage of a low delay of the E-UTRAN air interface can be fully utilized, and a transmission delay of the NAS signaling over the air interface can be reduced, thereby improving user experience.

Figure 3:
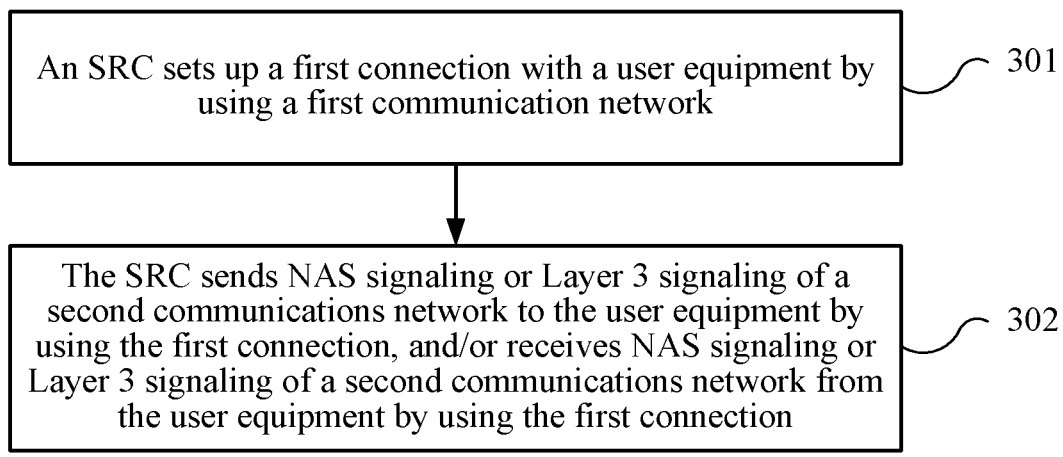
FIG. 3 is a flowchart of a communication method according to another embodiment of the present invention.

FIG. 3 is a flowchart of a communication method according to another embodiment of the present invention. The method of FIG. 3 is executed by an SRC, for example, the SRC 105 shown in FIG. 1. The method of FIG. 3 corresponds to the method of FIG. 2; and therefore, repeated descriptions are properly omitted.

301: The SRC establishes a first connection with a user equipment by using a first communications network.

302: The SRC sends NAS signaling or Layer 3 signaling of a second communications network to the user equipment by using the first connection, and/or receives NAS signaling or Layer 3 signaling of a second communications network from the user equipment by using the first connection.

The first communications network and the second communications network use different RATs, and the SRC is configured to manage radio resources of the first communications network and the second communications network.

Therefore, in this embodiment of the present invention, NAS/L3 signaling of a second communications network is transmitted over a first connection established in a first communications network, so that a service can flexibly switch between different RATs, and the system efficiency is improved.

Optionally, as an embodiment, in step 302, the SRC may receive first NAS signaling that is sent by the user equipment by using the first connection, where the first NAS signaling is used to register with or perform a location update to the second communications network. In this case, the SRC may forward the first NAS signaling to the second communications network, that is, forward the first NAS signaling to a core network element of the second communications network.

Optionally, as another embodiment, the first NAS signaling or a message or data that carries the first NAS signaling may carry type information of the second communications network. In this case, the SRC may determine the second communications network according to the type information.

Optionally, as another embodiment, the SRC may receive second NAS signaling sent by the second communications network, where the second NAS signaling is used to respond to the first NAS signaling or is NAS signaling that is initiated by the second communications network and related to registration or location update. In this case, in step 302, the SRC may send the second NAS signaling to the user equipment by using the first connection.

Optionally, as another embodiment, for subsequent use, the SRC may record an identifier of the user equipment, and information about the first communications network on which the user equipment camps and/or information about the second communications network with which the user equipment is registered.

Optionally, as another embodiment, in step 302, the SRC may receive third NAS signaling that is sent by the user equipment by using the first connection, where the third NAS signaling is used to set up a service such as a call service or a packet service in the second communications network. In this case, the SRC may forward the third NAS signaling to the second communications network.

Optionally, as another embodiment, the third NAS signaling or a message or data that carries the third NAS signaling may carry the type information of the second communications network. In this case, the SRC may determine the second communications network according to the type information.

Optionally, as another embodiment, the SRC may receive fourth NAS signaling sent by the second communications network, where the fourth NAS signaling is used to respond to the third NAS signaling or is NAS signaling initiated by the second communications network and related to service setup. In this case, in step 302, the SRC may send the fourth NAS signaling to the user equipment by using the first connection.

Optionally, as another embodiment, the SRC may allocate a service channel of the second communications network to the user equipment. In this case, in step 302, the SRC may send first Layer 3 signaling to the user equipment by using the first connection, where the first Layer 3 signaling is used to transfer the user equipment to the service channel of the second communications network.

Optionally, as another embodiment, before the SRC allocates the service channel of the second communications network to the user equipment, the SRC may send alerting signaling to the user equipment by using the first connection. The alerting signaling is also a type of NAS signaling. In addition, the alerting signaling may also be transmitted on a CS service channel of the second communications network in an existing manner.

Optionally, as another embodiment, the SRC may send fifth NAS signaling of the second communications network to the user equipment by using the first connection, where the fifth NAS signaling is a connected message. The SRC may further receive sixth NAS signaling that is sent by the user equipment by using the first connection, where the sixth NAS signaling is used to acknowledge the connected message of the second communications network (connected ack). In addition, the connected message and the connected ack message may also be transmitted on a CS service channel of the second communications network in an existing manner.

Optionally, as another embodiment, the SRC may send a measurement control message to the user equipment, where the measurement control message is used to instruct the user equipment to measure the second communications network; and receive a measurement report generated by the user equipment according to a result of the measurement. In this case, the SRC may allocate a service channel of the second communications network according to the measurement report.

Optionally, as another embodiment, the SRC may further receive capability indication information sent by the user equipment, where the capability indication information is used to indicate that the user equipment has a cross-RAT signaling transmission capability; and configure cross-RAT signaling transmission of the user equipment according to the capability indication information, for example, activate or allow the user equipment to perform cross-RAT signaling transmission.

Optionally, as another embodiment, the SRC may transmit, in the first communications network, the NAS signaling or Layer 3 signaling of the second communications network by using a signaling container. Specifically, the SRC may receive the NAS signaling or the Layer 3 signaling of the second communications network, fill a signaling container with the NAS signaling or the Layer 3 signaling of the second communications network, and send the signaling container to the user equipment by using the first connection. In this way, the signaling container carries the NAS signaling or the Layer 3 signaling of the second communications network, so that the user equipment extracts and uses the NAS signaling or the Layer 3 signaling of the second communications network. Alternatively, the SRC may receive the signaling container from the user equipment by using the first connection, where the signaling container carries the NAS signaling or the Layer 3 signaling of the second communications network; and then the SRC may extract, from the signaling container, the NAS signaling or the Layer 3 signaling of the second communications network, and send the extracted NAS signaling or Layer 3 signaling of the second communications network to the second communications network, for example, forward the extracted NAS signaling or Layer 3 signaling of the second communications network to a network element corresponding to the NAS signaling or the Layer 3 signaling. However, in this embodiment of the present invention, a cross-RAT signaling interworking manner is not limited to the signaling container, and may be any appropriate message or data.

Embodiments of the present invention are described below in more detail with reference to specific examples.

Figure 4:
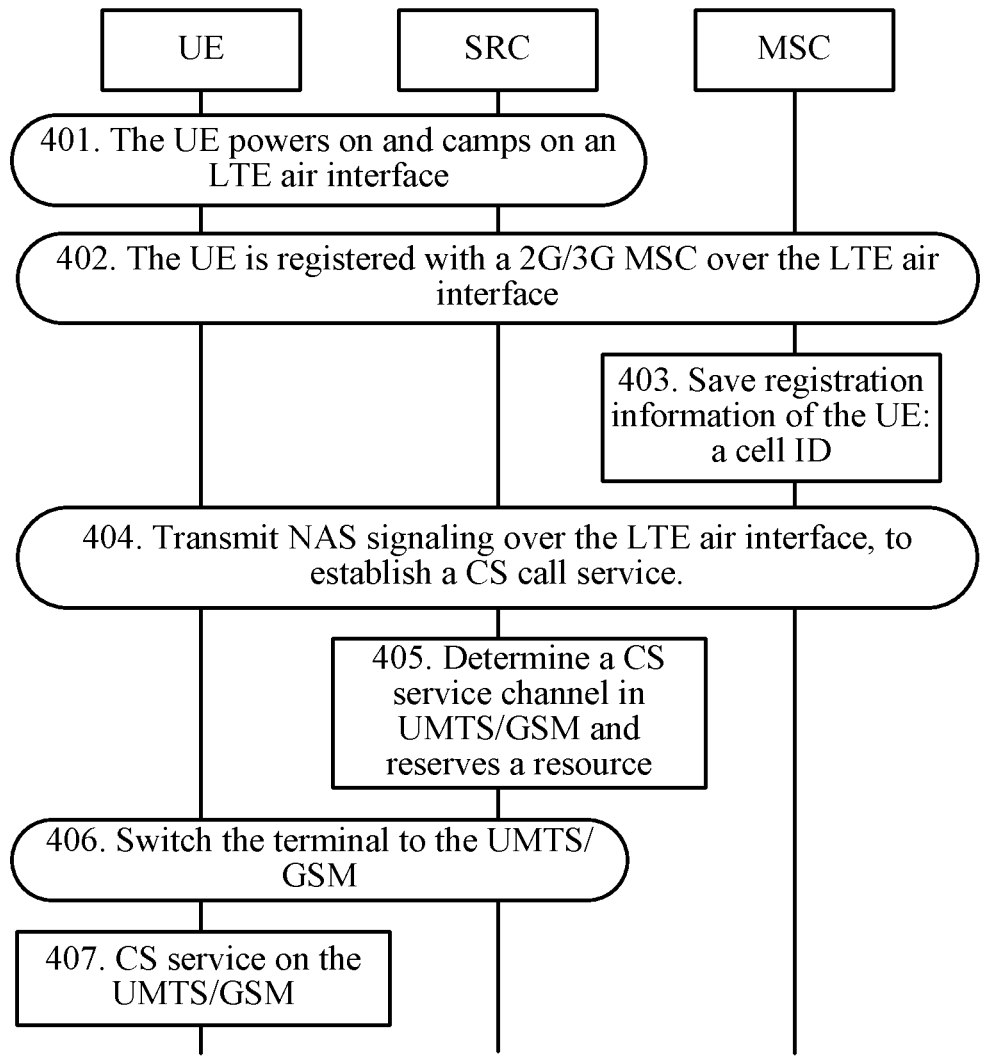
FIG. 4 is a schematic flowchart of a communication process according to an embodiment of the present invention.

FIG. 4 is a schematic flowchart of a communication process according to an embodiment of the present invention. FIG. 4 describes a main procedure of implementing, by a UE, UTMS/GSM registration and CS calling in an LTE system. The embodiment of FIG. 4 is described by using an example in which a UE initiates a call service, but this embodiment of the present invention is not limited thereto, and is also applicable to a case in which a UE initiates a packet service.

In FIG. 4, the UE may be the UE 101 of FIG. 1, an SRC may be the SRC 105 of FIG. 1, and an MSC may be the MSC 106 of FIG. 1.

401: A UE camps on an LTE air interface, that is, the UE may listen on channels of the LTE, such as a BCCH and a CCCH; and the UE establishes an LTE RRC connection (which is an example of the foregoing first connection) with the SRC according to received BCCH/CCCH information.

Optionally, the UE may further indicate to the SRC that the UE has a cross-RAT signaling transmission capability, and this capability indication information may also be reported in a procedure of performing, by the UE, NAS registration.

402: The UE initiates an MSC registration procedure over the LTE air interface. For example, the UE may implement MSC registration by using the foregoing first NAS signaling and the foregoing second NAS signaling.

Specifically, the UE may indicate to the SRC that MSC registration is to be performed. For example, the UE may place a NAS message about MSC registration in a NAS container and send the NAS message to the SRC.

The SRC recognizes that NAS registration of the UE is registration with the MSC, and sends NAS signaling to the corresponding MSC. In this case, if the UE reports information indicating the cross-RAT signaling transmission capability, the SRC may configure/activate the UE to allow cross-RAT signaling transmission.

The SRC extracts the NAS message from the NAS container, and forwards the NAS message to the corresponding MSC. If the SRC receives a NAS response message sent by the MSC, the SRC fills the NAS container with the NAS response message, and sends the NAS container to the UE over the LTE air interface.

The UE receives the NAS container that is sent by the SRC over the LTE air interface, extracts the NAS response message from the NAS container, and delivers the NAS response message to a corresponding UMTS/GSM NAS protocol stack for processing.

In this case, the SRC may record an identifier of the UE, an LTE cell on which the UE currently camps, and/or information about the corresponding MSC with which the UE registers; and perform similar processing on a subsequent NAS message.

403: A core network device such as the MSC or an HSS (Home Subscriber Server, home subscriber server) may save related registration information of the UE such as a cell ID (identifier).

In this way, a cross-RAT registration operation is implemented. If the UE has already been registered with the second communications network before initiating a call, step 402 to step 403 may be omitted.

404: The UE transmits, over the LTE air interface, NAS signaling related to CS call setup, to set up a CS call service. Related existing NAS signaling may be used as a NAS message related to CS call setup.

405: The SRC allocates a UMTS/GSM CS service channel and reserves a corresponding resource.

After the SRC recognizes the NAS signaling about CS call setup, the SRC may initiate a procedure of setting up the UMTS/GSM CS service channel. For example, the MSC may send a call proceeding (call proceeding) message, which indicates that call setup is completed. Alternatively, the MSC may instruct the SRC to set up the UMTS/GSM CS service channel for the UE.

406: The SRC delivers signaling over the LTE air interface, to transfer the UE to the UMTS/GSM CS service channel.

For example, the SRC may construct an assignment message or a handover message, and send the assignment message or the handover message to the UE, so as to transfer the UE to the UMTS/GSM CS service channel.

407: The UE performs a CS voice service on the UMTS/GSM CS service channel.

In this way, an advantage of a low delay of an E-UTRAN air interface can be fully utilized, and a transmission delay of NAS signaling over the air interface can be reduced.

Figure 5:
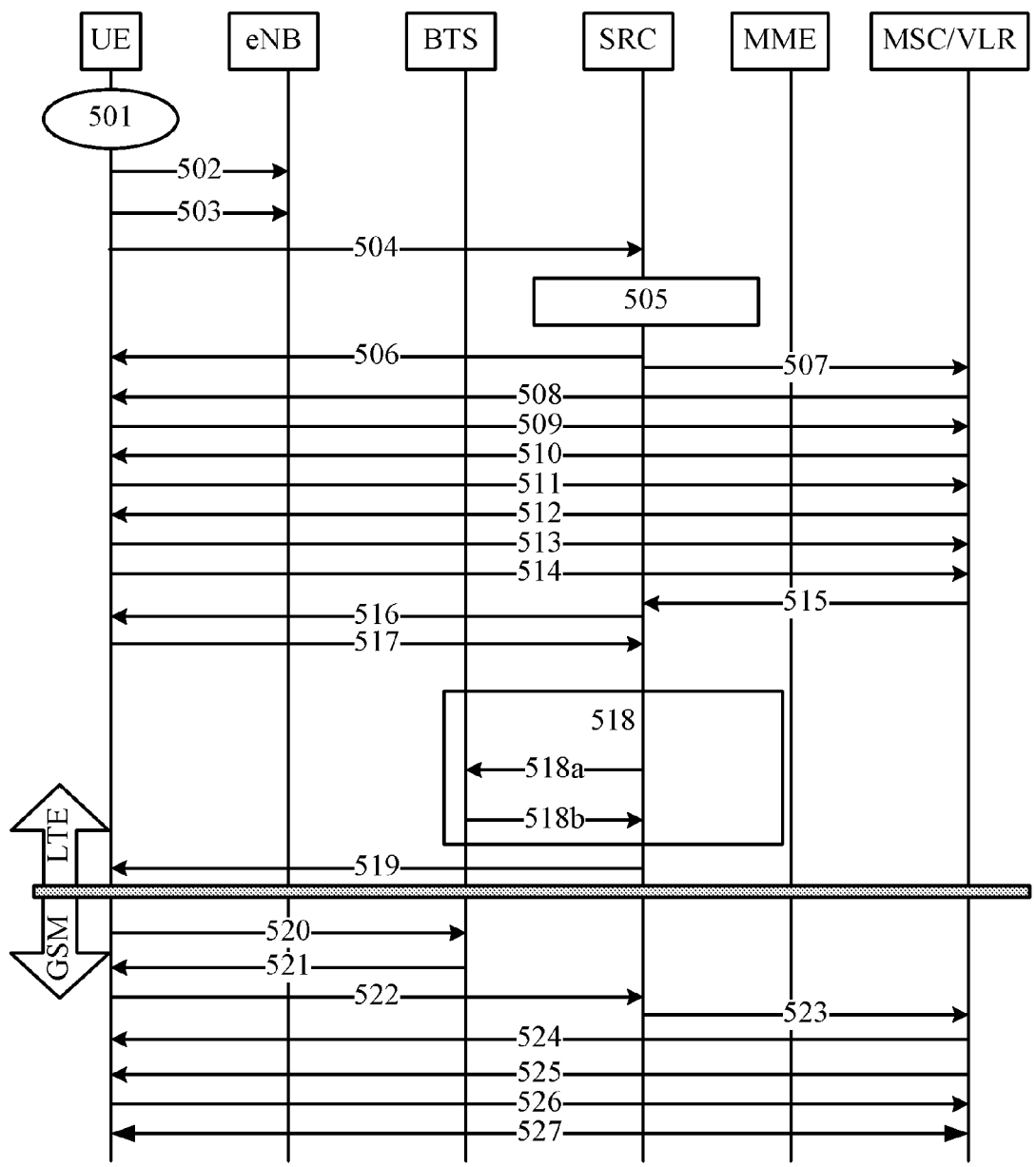
FIG. 5 is a schematic flowchart of a communication process according to another embodiment of the present invention.

FIG. 5 is a schematic flowchart of a communication process according to another embodiment of the present invention. FIG. 5 describes in detail a process of initiating, by a UE that camps on LTE, a GSM CS call. In addition, in FIG. 5, the UE measures a GSM network, so that an SRC allocates an appropriate CS service channel.

501: The UE triggers the CS call.

Assuming that the UE is in an idle state before initiating the call, the UE needs to establish an RRC connection over an LTE air interface. Step 502 to step 503 describe, in a non-exhaustive manner, main signaling for establishing the RRC connection. On the other hand, if the UE is in a connected state before initiating the call, step 502 to step 503 may be omitted.

502: RRC connection request message (RRC connection request).

503: RRC connection setup complete message (RRC connection setup complete).

504: After an LTE RRC connection is established, the UE sends a CM (Call Management, call management) service request message (CM service request) to an SRC.

The CM service request message is corresponding to a GSM MSC, is an example of the foregoing third NAS signaling, and may be sent to the SRC by using the LTE RRC connection.

505: The SRC detects the CS call.

By receiving an RRC message, and recognizing that the RRC message includes a NAS message for setting up a CS call to the MSC, the SRC finds a corresponding MSC for the UE.

Alternatively, the SRC may find a corresponding MSC according to saved UE information. For example, the SRC may find, according to the UE information recorded in step 402 of FIG. 4, an MSC with which the UE has already been registered.

506: The SRC sends a measurement control message such as a GSM NCL (Neighbor Cell List, neighbor cell list) reporting indication message (GSM NCL reporting indication) to the UE.

To allocate an appropriate service channel to the UE, the SRC requires the UE to measure a GSM network that executes a CS voice service subsequently.

Therefore, after the RRC connection over the LTE air interface is set up, the SRC may deliver the measurement control message to instruct the UE to measure a cell of a corresponding standard. For example, if the SRC knows a CS call service initiated by the UE to a 2G MSC, the SRC may instruct the UE to measure a GERAN neighboring cell.

507: The SRC forwards the CM service request message to a corresponding MSC.

In the embodiment of FIG. 5, it is assumed that the MSC and a VLR (Visitor Location Register, visitor location register) are located in a same entity. However, this embodiment of the present invention is not limited thereto, and is also applicable to a scenario in which the MSC and the VLR are separated, and such application still falls within the scope of this embodiment of the present invention.

In addition, it should be noted that a sequence of executing step 506 and step 507 is not limited in this embodiment of the present invention. Step 506 may also be executed after step 507, and is not necessarily completed before 508, that is, step 506 may be executed after step 508, or step 506 and step 507 are executed simultaneously.

508: The MSC/VLR sends an authentication request message (authentication request) to the UE.

509: The UE sends an authentication response message (authentication response) to the MSC/VLR.

510: The MSC/VLR sends a ciphering mode command message (ciphering mode command) to the UE.

511: The UE sends a ciphering mode complete message (ciphering mode complete) to the MSC/VLR.

512: The MSC/VLR sends a TMSI (Temporary Mobile Subscriber Identity, temporary mobile subscriber identity) relocation command message (TMSI relocation command) to the UE.

513: The UE sends a TMSI relocation complete message (TMSI relocation complete) to the MSC/VLR.

514: The UE sends a service setup message (SETUP) to the MSC/VLR.

In this case, because an air interface connection between the UE and GSM is not established, in step 508 to step 514, signaling between the UE and the GSM MSC may be transmitted over the LTE air interface according to the methods of FIG. 2 and FIG. 3.

515: The MSC sends a call proceeding message (call proceeding) to the SRC, which indicates that call setup is completed and serves as a response (namely, an example of the foregoing fourth NAS message) to the CM service request message in step 504.

516: The SRC forwards the call proceeding message (call proceeding) to the UE. For example, the SRC may execute step 516 by using the LTE RRC connection.

517: The UE completes measurement on a GSM network, and sends a measurement report (GSM NCL reporting) to the SRC.

Step 517 may be executed between step 507 and step 516, and is not necessarily executed after step 516. It is assumed that step 517 can be completed before the SRC allocates a GSM service channel to the UE.

518: The SRC allocates a GSM service channel to the UE according to the measurement report of the UE. When the SRC allocates the GSM service channel, reference may further be made to a corresponding implementation policy. Reference may be made to step 518*a* and step 518*b* for a method for allocating the GSM service channel.

518*a*: The SRC sends a channel activation message (channel activation) to a corresponding BTS.

518*b*: The BTS returns a channel activation completion message (channel activation ack) to the SRC, which indicates that allocation of a corresponding service channel is completed.

519: The SRC sends an assignment command or a handover command to the UE, to transfer the UE to the GSM network.

The command in step 519 is L3 signaling, and may be sent to the UE over the LTE air interface connection according to the methods of FIG. 2 and FIG. 3.

Step 501 to step 519 are operations in an LTE system. NAS messages in a process of setting up a GSM call are transmitted in step 508 to step 516, and the NAS messages during transmission may be added or deleted according to a network configuration, for example, a NAS message for querying a user equipment capability or the like is added.

Step 520 to step 527 are operations in a GSM system, and may be the same as corresponding operations in a CS call process in the prior art. Therefore, a detailed description is properly omitted.

520: The UE sends an SABM (Set Asynchronous Balanced Mode, set asynchronous balanced mode) message to the BTS.

521: The BTS returns a UA (Unnumbered Acknowledgment, unnumbered acknowledgment) message to the UE.

522: The UE sends an assignment complete message (assignment complete) to the SRC, which indicates that setup of the service channel is completed.

523: The SRC forwards the assignment complete message (assignment complete) to the MSC.

524: The MSC sends an alerting message (altering) to the UE.

The alerting message is transmitted over the CS service channel set up by the SRC for the UE. The alerting message is sent to the UE after it is ensured that the service channel is set up, and in this way, a user can instantly perform a voice call by pressing an answering key.

525: If a called party determines to answer the current call, the MSC sends a connected message (connected) to the UE.

526: The UE sends a connection acknowledgment message (connected ack) to the MSC.

527: After connection is completed, the UE executes a voice service in a GSM system.

In this way, the SRC may allocate an appropriate GSM service channel according to the measurement report of the UE, so as to improve call experience of the user.

Figure 6:
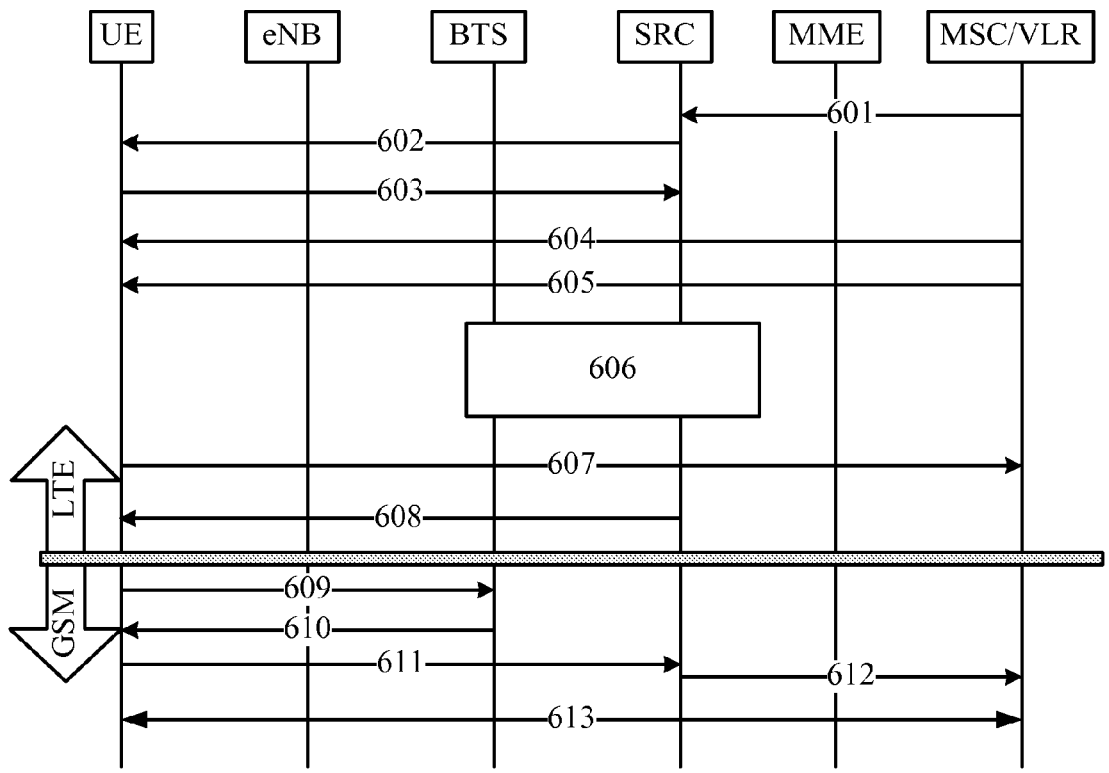
FIG. 6 is a flowchart of a communication process according to another embodiment of the present invention.

FIG. 6 is a flowchart of a communication process according to another embodiment of the present invention. In FIG. 6, time when a service channel is assigned is later than that in FIG. 5. In addition, in the embodiment of FIG. 6, a detailed description of a process the same as that in FIG. 5 is properly omitted.

Step 601 to step 603 are the same as step 515 to step 517 in FIG. 5. Steps before step 601 (namely, step 501 to step 514 in FIG. 5) are not described for the purpose of brevity.

601: An MSC sends a call proceeding message (call proceeding) to an SRC, which indicates that setup of a call is completed.

602: The SRC forwards the call proceeding message (call proceeding) to a UE. For example, the SRC may execute step 602 by using an LTE RRC connection.

603: The UE completes measurement on a GSM network, and sends a measurement report (GSM NCL reporting) to the SRC. Step 603 is an optional step, or may only need to be executed before step 606.

604: After sending the call proceeding, the MSC sends an alerting message (alerting). The SRC sends the alerting message to the UE over an LTE air interface. The alerting message is also a type of NAS signaling.

605: If a called party determines to answer the current call, the MSC sends a connected message (connected) to the UE.

The connected message is an example of the foregoing fifth NAS signaling, and may be transmitted over the LTE air interface according to the methods of FIG. 2 and FIG. 3.

606: After receiving the connected message, the SRC triggers a procedure of setting up a GSM service channel. Step 606 may be executed in a manner the same as that of step 518, and therefore is not described in detail again.

607: After receiving the connected message, the UE sends a connection acknowledgment message (connected ack) to the MSC. The connection acknowledgment message is an example of the foregoing sixth NAS signaling, and may also be sent over the LTE air interface.

608: The SRC sends an assignment command or a handover command to the UE, to transfer the UE to the GSM network.

After receiving the connected ack, and determining that a service channel is successfully reserved, the SRC may transfer the UE to the service channel, where the transfer may be implemented by delivering the assignment command or the handover command to the UE.

Step 609 to step 613 are operations in a GSM system, and may be the same as corresponding operations in a CS call process in the prior art. Therefore, a detailed description is properly omitted.

609: The UE sends an SABM (Set Asynchronous Balanced Mode, set asynchronous balanced mode) message to the BTS.

610: The BTS returns a UA (Unnumbered Acknowledgment, unnumbered acknowledgment) message to the UE.

611: The UE sends an assignment complete message (assignment complete) to the SRC, which indicates that setup of the service channel is completed.

612: The SRC forwards the assignment complete message (assignment complete) to the MSC.

613: After connection is completed, the UE executes a voice service in a GSM system.

In the embodiment of FIG. 6, a manner of assigning a service channel at a later time is used, in which the service channel is set up after a called user answers the call. An advantage of this manner is that if the called user does not reply, it is unnecessary to allocate the service channel to the calling UE, thereby saving a resource.

Figure 7:
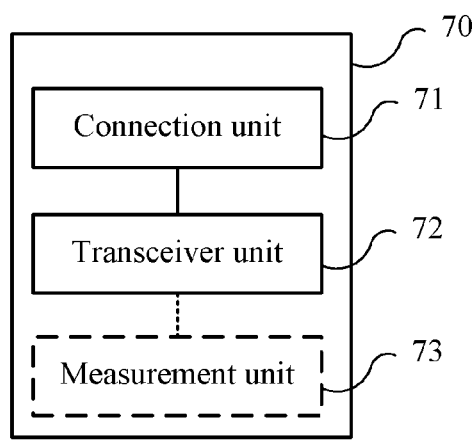
FIG. 7 is a block diagram of a user equipment according to an embodiment of the present invention.

FIG. 7 is a block diagram of a user equipment according to an embodiment of the present invention. One example of a user equipment 70 in FIG. 7 is the UE 101 in FIG. 1, and the user equipment 70 includes a connection unit 71 and a transceiver unit 72.

The connection unit 71 is configured to establish a first connection with an SRC by using a first communications network. The transceiver unit 72 sends NAS signaling or Layer 3 signaling of a second communications network to the SRC by using the first connection established by the connection unit 71, and/or receives NAS signaling or Layer 3 signaling of a second communications network from the SRC by using the first connection established by the connection unit 71. The first communications network and the second communications network use different RATs, and the SRC is configured to manage radio resources of the first communications network and the second communications network.

Therefore, in this embodiment of the present invention, NAS/L3 signaling of a second communications network is transmitted over a first connection established in a first communications network, so that a service can flexibly switch between different RATs, and the system efficiency is improved.

The user equipment 70 can implement various UE-related operations in FIG. 1 to FIG. 6, which are not described in detail to avoid repetition.

Optionally, as an embodiment, the transceiver unit 72 may send first NAS signaling of the second communications network to the SRC by using the first connection, where the first NAS signaling is used to register with or perform a location update to the second communications network.

Optionally, as another embodiment, the transceiver unit 72 may receive second NAS signaling of the second communications network that is sent by the SRC by using the first connection, where the second NAS signaling is used to respond to the first NAS signaling or is NAS signaling that is initiated by the second communications network and related to registration or location update.

Optionally, as another embodiment, the transceiver unit 72 may send, to the SRC by using the first connection, third NAS signaling for setting up a service in the second communications network.

Optionally, as another embodiment, the transceiver unit 72 may receive fourth NAS signaling of the second communications network that is sent by the SRC by using the first connection, where the fourth NAS signaling is used to respond to the third NAS signaling or is NAS signaling initiated by the second communications network and related to service setup.

Optionally, as another embodiment, the transceiver unit 72 may receive first Layer 3 signaling that is sent by the SRC by using the first connection, where the first Layer 3 signaling is used to transfer the user equipment to the second communications network. The connection unit 71 may further establish a second connection with the second communications network according to the first Layer 3 signaling, and execute a service over the second connection.

Optionally, as another embodiment, before the transceiver unit 72 receives the first Layer 3 signaling, the transceiver unit 72 may receive alerting signaling that is sent by the SRC by using the first connection. The alerting signaling is also a type of NAS signaling.

Optionally, as another embodiment, the transceiver unit 72 may receive fifth NAS signaling of the second communications network that is sent by the SRC by using the first connection, where the fifth NAS signaling is a connected message; and send sixth NAS signaling to the SRC by using the first connection, where the sixth NAS signaling is used to acknowledge the connected message.

Optionally, the user equipment 70 may further include a measurement unit 73, configured to measure the second communications network, and generate a measurement report according to a result of the measurement. The transceiver unit 72 may send, to the SRC by using the first connection, the measurement report generated by the measurement unit.

Optionally, as another embodiment, the transceiver unit 72 may send capability indication information to the SRC, where the capability indication information is used to indicate that the user equipment has a cross-RAT signaling transmission capability.

Optionally, as another embodiment, the transceiver unit 72 may send a signaling container to the SRC by using the first connection, where the signaling container carries the NAS signaling or the Layer 3 signaling of the second communications network. Alternatively, the transceiver unit 72 may receive the signaling container from the SRC by using the first connection, where the signaling container carries the NAS signaling or the Layer 3 signaling of the second communications network.

Figure 8:
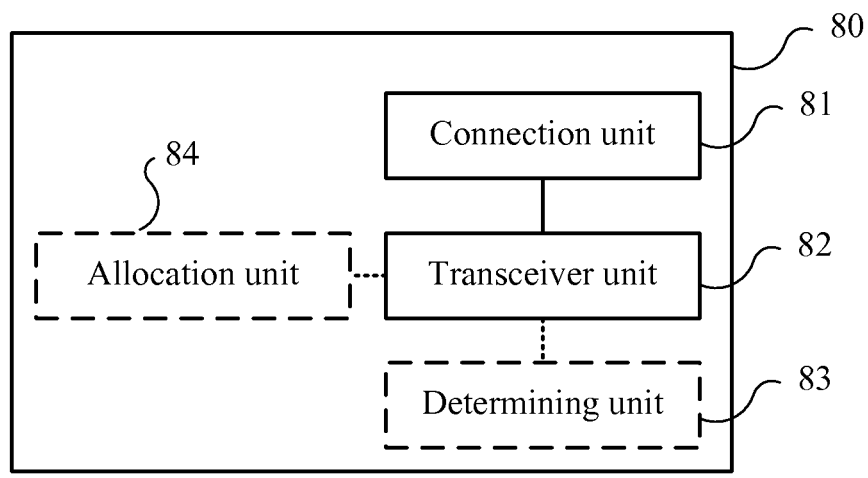
FIG. 8 is a block diagram of an SRC according to an embodiment of the present invention.

FIG. 8 is a block diagram of an SRC according to an embodiment of the present invention. One example of an SRC 80 in FIG. 8 is the SRC 105 in FIG. 1, and the SRC 80 includes a connection unit 81 and a transceiver unit 82.

The connection unit 81 is configured to establish a first connection with a user equipment by using a first communications network. The transceiver unit 82 sends NAS signaling or Layer 3 signaling of a second communications network to the user equipment by using the first connection established by the connection unit 81, and/or receive NAS signaling or Layer 3 signaling of a second communications network from the user equipment by using the first connection established by the connection unit 81. The first communications network and the second communications network use different RATs, and the SRC 80 is configured to manage radio resources of the first communications network and the second communications network.

Therefore, in this embodiment of the present invention, NAS/L3 signaling of a second communications network is transmitted over a first connection established in a first communications network, so that a service can flexibly switch between different RATs, and the system efficiency is improved.

The SRC 80 can implement various SRC-related operations in FIG. 1 to FIG. 6, which are not described in detail to avoid repetition.

Optionally, as an embodiment, the transceiver unit 82 may receive first NAS signaling that is sent by the user equipment by using the first connection, where the first NAS signaling is used to register with or perform a location update to the second communications network. The transceiver unit 82 may forward the first NAS signaling to the second communications network.

Optionally, as another embodiment, the first NAS signaling or a message or data that carries the first NAS signaling carries type information of the second communications network. The SRC 80 may further include a determining unit 83, configured to determine the second communications network according to the type information, so that the transceiver unit 82 can forward NAS signaling of the second communications network.

Optionally, as another embodiment, the transceiver unit 82 may receive second NAS signaling sent by the second communications network, where the second NAS signaling is used to respond to the first NAS signaling or is NAS signaling that is initiated by the second communications network and related to registration or location update; and send the second NAS signaling to the user equipment by using the first connection.

Optionally, as another embodiment, the third NAS signaling or a message or data that carries the third NAS signaling may carry the type information of the second communications network. The SRC 80 may further include the determining unit 83, configured to determine the second communications network according to the type information.

Optionally, as another embodiment, the transceiver unit 82 may receive fourth NAS signaling sent by the second communications network, where the fourth NAS signaling is used to respond to the third NAS signaling or is NAS signaling initiated by the second communications network and related to service setup; and send the fourth NAS signaling to the user equipment by using the first connection.

Optionally, as another embodiment, the SRC 80 may record an identifier of the user equipment, and information about the first communications network on which the user equipment camps and/or information about the second communications network with which the user equipment is registered.

Optionally, as another embodiment, the transceiver unit 82 may receive third NAS signaling that is sent by the user equipment by using the first connection, where the third NAS signaling is used to set up a service in the second communications network; and the transceiver unit 82 forwards the third NAS signaling to the second communications network.

Optionally, as another embodiment, the SRC 80 further includes an allocation unit 84, configured to allocate a service channel of the second communications network to the user equipment. The transceiver unit 82 may send first Layer 3 signaling to the user equipment by using the first connection, where the first Layer 3 signaling is used to transfer the user equipment to the service channel of the second communications network allocated by the allocation unit.

Optionally, as another embodiment, before the allocation unit 84 allocates the service channel of the second communications network to the user equipment, the transceiver unit 82 may send alerting signaling to the user equipment by using the first connection. The alerting signaling is also a type of NAS signaling.

Optionally, as another embodiment, the transceiver unit 82 may send fifth NAS signaling of the second communications network to the user equipment by using the first connection, where the fifth NAS signaling is a connected message; and receive sixth NAS signaling that is sent by the user equipment by using the first connection, where the sixth NAS signaling is used to acknowledge the connected message of the second communications network.

Optionally, as another embodiment, the transceiver unit 82 may send a measurement control message to the user equipment, where the measurement control message is used to instruct the user equipment to measure the second communications network; and receive a measurement report generated by the user equipment according to a result of the measurement.

Optionally, as another embodiment, the transceiver unit 82 may receive the NAS signaling or the Layer 3 signaling of the second communications network, and send a signaling container to the user equipment by using the first connection, where the signaling container carries the NAS signaling or the Layer 3 signaling of the second communications network. Alternatively, the transceiver unit 82 may receive the signaling container from the user equipment by using the first connection, where the signaling container carries the NAS signaling or the Layer 3 signaling of the second communications network; and send the NAS signaling or the Layer 3 signaling of the second communications network to the second communications network.

Figure 9:
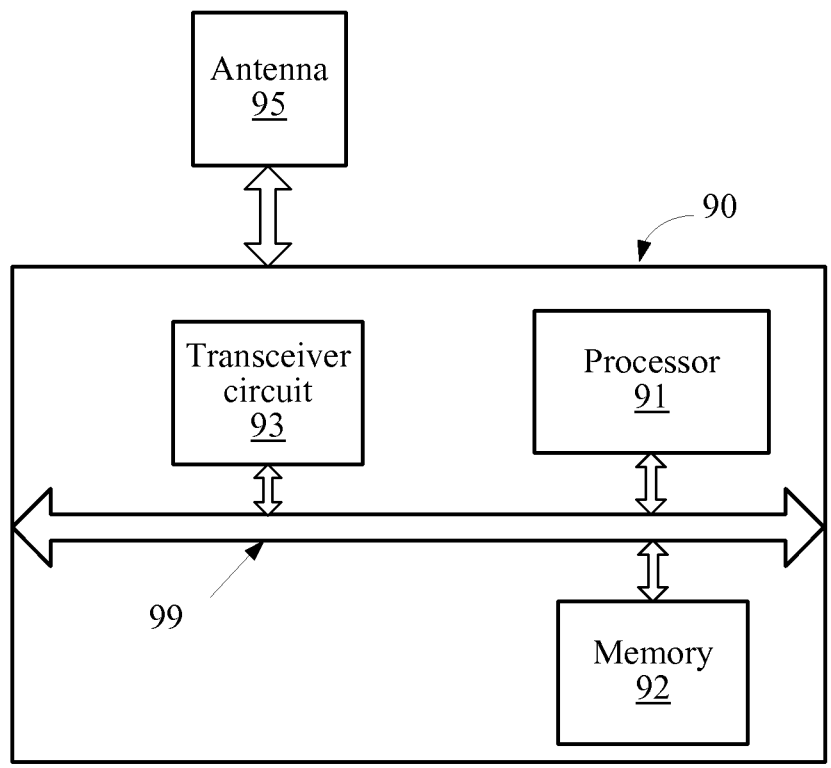
FIG. 9 is a block diagram of a user equipment according to another embodiment of the present invention.

FIG. 9 is a block diagram of a user equipment according to another embodiment of the present invention. One example of a user equipment 90 in FIG. 9 is the UE 101 in FIG. 1, and the user equipment 90 includes a processor 91, a memory 92, and a transceiver circuit 93. The processor 91, the memory 92, and the transceiver circuit 93 are connected by using a bus system 99.

The memory 92 stores an instruction that enables the processor 91 to perform the following operations: establishing, by using the transceiver circuit 93, a first connection with an SRC by using a first communications network.

The transceiver circuit 93 is configured to: under the control of the processor 91, send NAS signaling or Layer 3 signaling of a second communications network to the SRC by using the first connection, and/or receive NAS signaling or Layer 3 signaling of a second communications network from the SRC by using the first connection, where the first communications network and the second communications network use different RATs, and the SRC is configured to manage radio resources of the first communications network and the second communications network.

Therefore, in this embodiment of the present invention, NAS/L3 signaling of a second communications network is transmitted over a first connection that is established in a first communications network, so that a service can flexibly switch between different RATs, and the system efficiency is improved.

In addition, the user equipment 90 may further include an antenna 95. The processor 91 controls an operation of the user equipment 90. The memory 92 may include a read-only memory and a random access memory, and provides an instruction and data to the processor 91. In a specific application, the transceiver circuit 93 may be coupled to the antenna 95. All components of the user equipment 90 are coupled by using the bus system 99, where in addition to a data bus, the bus system 99 may further include a power source bus, a control bus, a status signal bus, and the like, but for the purpose of clear description, all types of buses are marked as the bus system 99 in the figure.

The methods disclosed in the foregoing embodiments of the present invention may be applied to the processor 91, or in other words, may be implemented by the processor 91. The processor 91 may be an integrated circuit chip and has a signal processing capability. In an implementation process, steps in the foregoing methods may be implemented by using a hardware integrated logical circuit in the processor 91, or an instruction in the form of software. The processor 91 may be a CPU (central processing unit), a general-purpose processor, a digital signal processor (DSP), an application-specific integrated circuit (ASIC), a field-programmable gate array (FPGA) or another programmable logical device, a discrete gate or transistor logical device, or a discrete hardware component; and may implement or execute methods, steps, and logical block diagrams disclosed in the embodiments of the present invention. The general-purpose processor may be a micro-processor, or the processor may also be any conventional processor or the like. The steps in the methods disclosed by the embodiments of the present invention may be directly implemented by a hardware processor, or may be implemented by combining hardware and software modules in a processor. The software module may be located in a mature storage medium in the field, such as a random access memory, a flash memory, a read-only memory, a programmable read-only memory, an electrically erasable programmable memory, or a register. The storage medium is located in the memory 92, and the processor 91 reads information in the memory 92 and performs the steps of the foregoing methods in combination with hardware of the processor 91.

The user equipment 90 can implement various UE-related operations in FIG. 1 to FIG. 6, which are not described in detail to avoid repetition.

Optionally, as an embodiment, the transceiver circuit 93 may send first NAS signaling of the second communications network to the SRC by using the first connection, where the first NAS signaling is used to register with or perform a location update to the second communications network.

Optionally, as another embodiment, the transceiver circuit 93 may receive second NAS signaling of the second communications network that is sent by the SRC by using the first connection, where the second NAS signaling is used to respond to the first NAS signaling or is NAS signaling that is initiated by the second communications network and related to registration or location update.

Optionally, as another embodiment, the transceiver circuit 93 may send, to the SRC by using the first connection, third NAS signaling for setting up a service in the second communications network.

Optionally, as another embodiment, the transceiver circuit 93 may receive fourth NAS signaling of the second communications network that is sent by the SRC by using the first connection, where the fourth NAS signaling is used to respond to the third NAS signaling or is NAS signaling initiated by the second communications network and related to service setup.

Optionally, as another embodiment, the transceiver circuit 93 may receive first Layer 3 signaling that is sent by the SRC by using the first connection, where the first Layer 3 signaling is used to transfer the user equipment to the second communications network. The processor 91 may further establish, by using the transceiver circuit 93, a second connection with the second communications network according to the first Layer 3 signaling, and execute a service over the second connection.

Optionally, as another embodiment, before the transceiver circuit 93 receives the first Layer 3 signaling, the transceiver circuit 93 may receive alerting signaling that is sent by the SRC by using the first connection. The alerting signaling is also a type of NAS signaling.

Optionally, as another embodiment, the transceiver circuit 93 may receive fifth NAS signaling of the second communications network that is sent by the SRC by using the first connection, where the fifth NAS signaling is a connected message; and send sixth NAS signaling to the SRC by using the first connection, where the sixth NAS signaling is used to acknowledge the connected message.

Optionally, the processor 91 controls the user equipment 90 to measure the second communications network, and generate a measurement report according to a result of the measurement. The transceiver circuit 93 may send, to the SRC by using the first connection, the measurement report generated by the measurement unit.

Optionally, as another embodiment, the transceiver circuit 93 may send capability indication information to the SRC, where the capability indication information is used to indicate that the user equipment has a cross-RAT signaling transmission capability.

Optionally, as another embodiment, the transceiver circuit 93 may send a signaling container to the SRC by using the first connection, where the signaling container carries the NAS signaling or the Layer 3 signaling of the second communications network. Alternatively, the transceiver circuit 93 may receive the signaling container from the SRC by using the first connection, where the signaling container carries the NAS signaling or the Layer 3 signaling of the second communications network.

Figure 10:
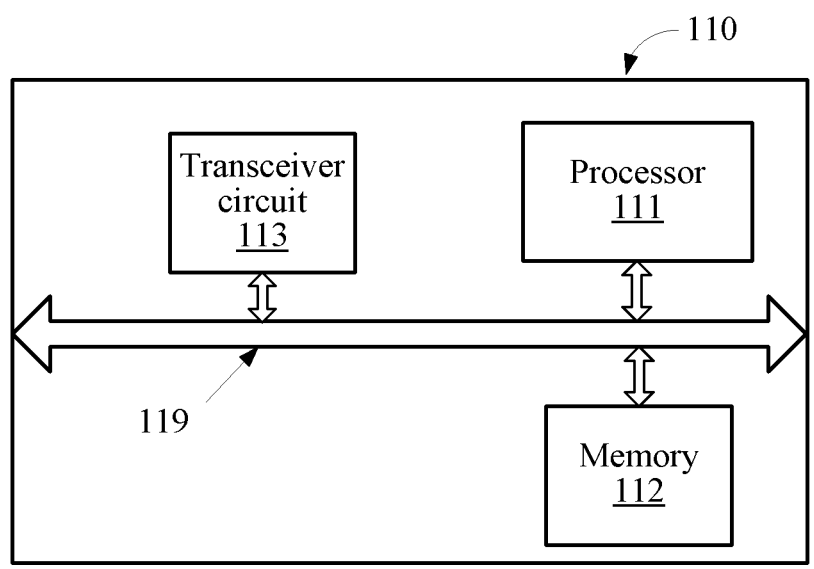
FIG. 10 is a block diagram of an SRC according to another embodiment of the present invention.

FIG. 10 is a block diagram of an SRC according to an embodiment of the present invention. One example of an SRC 110 in FIG. 10 is the SRC 105 in FIG. 1, and includes a processor 111, a memory 112, and a transceiver circuit 113. The processor 111, the memory 112, and the transceiver circuit 113 are connected by using a bus system 119.

The memory 112 stores an instruction that enables the processor 111 to perform the following operations: establishing, by using the transceiver circuit 113, a first connection with a user equipment by using a first communications network.

Under the control of the processor 111, the transceiver circuit 113 sends NAS signaling or Layer 3 signaling of a second communications network to the user equipment, and/or receives NAS signaling or Layer 3 signaling of a second communications network from the user equipment.

The first communications network and the second communications network use different RATs, and the SRC 110 is configured to manage radio resources of the first communications network and the second communications network.

Therefore, in this embodiment of the present invention, NAS/L3 signaling of a second communications network is transmitted over a first connection established in a first communications network, so that a service can flexibly switch between different RATs, and the system efficiency is improved.

The processor 111 controls an operation of the SRC 110. The memory 112 may include a read-only memory and a random access memory, and provides an instruction and data to the processor 111. All components of the SRC 110 are coupled by using the bus system 119, where in addition to a data bus, the bus system 119 may further include a power source bus, a control bus, a status signal bus, and the like, but for the purpose of clear description, all types of buses are marked as the bus system 119 in the figure.

The methods disclosed in the foregoing embodiments of the present invention may be applied to the processor 111, or in other words, may be implemented by the processor 111. The processor 111 may be an integrated circuit chip and has a signal processing capability. In an implementation process, steps in the foregoing methods may be implemented by using a hardware integrated logical circuit in the processor 111, or an instruction in the form of software. The processor 111 may be a CPU (Central Processing Unit, central processing unit), a general-purpose processor, a digital signal processor (DSP), an application-specific integrated circuit (ASIC), a field-programmable gate array (FPGA) or another programmable logical device, a discrete gate or transistor logical device, or a discrete hardware component; and may implement or execute methods, steps, and logical block diagrams disclosed in the embodiments of the present invention. The general-purpose processor may be a micro-processor, or the processor may also be any conventional processor or the like. The steps in the methods disclosed by the embodiments of the present invention may be directly implemented by a hardware processor, or may be implemented by combining hardware and software modules in a processor. The software module may be located in a mature storage medium in the field, such as a random access memory, a flash memory, a read-only memory, a programmable read-only memory, an electrically erasable programmable memory, or a register. The storage medium is located in the memory 112, and the processor 111 reads information in the memory 112 and performs the steps of the foregoing methods in combination with hardware of the processor.

The SRC 110 can implement various SRC-related operations in FIG. 1 to FIG. 6, which are not described in detail to avoid repetition.

Optionally, as an embodiment, the transceiver circuit 113 may receive first NAS signaling that is sent by the user equipment by using the first connection, where the first NAS signaling is used to register with or perform a location update to the second communications network. The transceiver circuit 113 may forward the first NAS signaling to the second communications network.

Optionally, as another embodiment, the first NAS signaling or a message or data that carries the first NAS signaling carries type information of the second communications network. The processor 111 determines the second communications network according to the type information, so that the transceiver circuit 113 can forward NAS signaling of the second communications network.

Optionally, as another embodiment, the transceiver circuit 113 may receive second NAS signaling sent by the second communications network, where the second NAS signaling is used to respond to the first NAS signaling or is NAS signaling that is initiated by the second communications network and related to registration or location update; and send the second NAS signaling to the user equipment by using the first connection.

Optionally, as another embodiment, the memory 112 may record an identifier of the user equipment, and information about the first communications network on which the user equipment camps and/or information about the second communications network with which the user equipment is registered.

Optionally, as another embodiment, the transceiver circuit 113 may receive third NAS signaling that is sent by the user equipment by using the first connection, where the third NAS signaling is used to set up a service in the second communications network; and the transceiver circuit 113 forwards the third NAS signaling to the second communications network.

Optionally, as another embodiment, the third NAS signaling or a message or data that carries the third NAS signaling may carry the type information of the second communications network. The processor 111 may determine the second communications network according to the type information.

Optionally, as another embodiment, the transceiver circuit 113 may receive fourth NAS signaling sent by the second communications network, where the fourth NAS signaling is used to respond to the third NAS signaling or is NAS signaling initiated by the second communications network and related to service setup; and send the fourth NAS signaling to the user equipment by using the first connection.

Optionally, as another embodiment, the processor 111 may allocate a service channel of the second communications network to the user equipment. The transceiver circuit 113 may send first Layer 3 signaling to the user equipment by using the first connection, where the first Layer 3 signaling is used to transfer the user equipment to the service channel of the second communications network allocated by the allocation unit.

Optionally, as another embodiment, before the processor 111 allocates the service channel of the second communications network to the user equipment, the transceiver circuit 113 may send alerting signaling to the user equipment by using the first connection. The alerting signaling is also a type of NAS signaling.

Optionally, as another embodiment, the transceiver circuit 113 may send fifth NAS signaling of the second communications network to the user equipment by using the first connection, where the fifth NAS signaling is a connected message; and receive sixth NAS signaling that is sent by the user equipment by using the first connection, where the sixth NAS signaling is used to acknowledge the connected message of the second communications network.

Optionally, as another embodiment, the transceiver circuit 113 may send a measurement control message to the user equipment, where the measurement control message is used to instruct the user equipment to measure the second communications network; and receive a measurement report generated by the user equipment according to a result of the measurement.

Optionally, as another embodiment, the transceiver circuit 113 may receive the NAS signaling or the Layer 3 signaling of the second communications network, and send a signaling container to the user equipment by using the first connection, where the signaling container carries the NAS signaling or the Layer 3 signaling of the second communications network. Alternatively, the transceiver circuit 113 may receive the signaling container from the user equipment by using the first connection, where the signaling container carries the NAS signaling or the Layer 3 signaling of the second communications network; and send the NAS signaling or the Layer 3 signaling of the second communications network to the second communications network.

A communications system in an embodiment of the present invention may include the foregoing user equipment 70 or 90, or the foregoing SRC 80 or 110.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. User equipment capable of communicating with a single radio controller (SRC) via a first communications network and also with a second communications network, comprising:
   a processor, configured to establish a first connection with the single radio controller (SRC) by using the first communications network; and
   a transceiver circuit, configured to send first non-access stratum (NAS) signaling or Layer 3 signaling of the second communications network to the SRC by using the first connection, or receive other NAS signaling or Layer 3 signaling of the second communications network from the SRC by using the first connection,
   wherein the first communications network and the second communications network use different radio access technologies (RATs), the SRC is configured to manage radio resources of the first communications network and the second communications network, and the second communications network responds to management by the SRC in addition to the first NAS signaling received from the transceiver circuit.

2. The user equipment according to claim 1, wherein the transceiver circuit is specifically configured to receive second NAS signaling of the second communications network that is sent by the SRC by using the first connection, wherein the second NAS signaling is used to respond to the first NAS signaling or is initiated by the second communications network and related to registration or location update.

3. The user equipment according to claim 1, wherein the transceiver circuit is specifically configured to send, to the SRC by using the first connection, second NAS signaling for setting up a service in the second communications network.

4. The user equipment according to claim 3, wherein the transceiver circuit is specifically configured to receive third NAS signaling of the second communications network that is sent by the SRC by using the first connection, wherein the third NAS signaling is used to respond to the second NAS signaling or is initiated by the second communications network and related to service setup.

5. The user equipment according to claim 1, wherein the transceiver circuit is specifically configured to receive first Layer 3 signaling that is sent by the SRC by using the first connection, wherein the first Layer 3 signaling is used to transfer the user equipment to the second communications network; and
   the processor is further configured to establish a second connection with the second communications network according to the first Layer 3 signaling, and execute a service over the second connection.

6. The user equipment according to claim 1, further comprising:
   the processor, configured to measure the second communications network, and generate a measurement report according to a result of the measurement; and
   the transceiver circuit is further configured to send, to the SRC by using the first connection, the measurement report.

7. The user equipment according to claim 1, wherein the transceiver circuit is further configured to send capability indication information to the SRC, wherein the capability indication information is used to indicate that the user equipment has a cross-RAT signaling transmission capability.

8. The user equipment according to claim 1, wherein the transceiver circuit is specifically configured to send a signaling container to the SRC by using the first connection, wherein the signaling container carries the first NAS signaling or the Layer 3 signaling of the second communications network; or
   the transceiver circuit is specifically configured to receive the signaling container from the SRC by using the first connection, wherein the signaling container carries the other NAS signaling or the Layer 3 signaling of the second communications network.

9. The user equipment according to claim 1 wherein the second communications network responds to management by the SRC by allocating radio resources thereof.

10. A single radio controller capable of communicating with user equipment via a first communications network and also communicating with a second communications network, comprising:
    a processor, configured to establish a first connection with the user equipment by using the first communications network; and
    a transceiver circuit, configured to send non-access stratum (NAS) signaling or Layer 3 signaling of a second communications network to the user equipment by using the first connection, or configured to receive first NAS signaling or Layer 3 signaling of the second communications network from the user equipment by using the first connection,
    wherein the first communications network and the second communications network use different radio access technologies (RATs), the single radio controller is configured to manage radio resources of the first communications network and the second communications network, and the second communications network responds to management by the SRC in addition to the first NAS signaling received from the transceiver circuit.

11. The single radio controller according to claim 10, wherein the transceiver circuit is specifically configured to receive the first NAS signaling that is sent by the user equipment by using the first connection, and
wherein the transceiver circuit is further configured to forward the first NAS signaling to the second communications network.

12. The single radio controller according to claim 11, wherein the first NAS signaling or a message or data that carries the first NAS signaling carries type information of the second communications network; and
the processor, configured to determine the second communications network according to the type information.

13. The single radio controller according to claim 11, wherein the transceiver circuit is further configured to receive second NAS signaling sent by the second communications network, wherein the second NAS signaling is used to respond to the first NAS signaling or is initiated by the second communications network and related to registration or location update; and send the second NAS signaling to the user equipment by using the first connection.

14. The single radio controller according to claim 10, wherein the transceiver circuit is specifically configured to receive second NAS signaling that is sent by the user equipment by using the first connection, wherein the second NAS signaling is used to set up a service in the second communications network; and
the transceiver circuit is further configured to forward the second NAS signaling to the second communications network.

15. The single radio controller according to claim 14, wherein the second NAS signaling or a message or data that carries the second NAS signaling carries the type information of the second communications network; and
the processor, further configured to determine the second communications network according to the type information.

16. The single radio controller according to claim 15, wherein the transceiver circuit is further configured to receive third NAS signaling sent by the second communications network, wherein the third NAS signaling is used to respond to the second NAS signaling or is initiated by the second communications network and related to service setup; and send the third NAS signaling to the user equipment by using the first connection.

17. The single radio controller according to claim 10, wherein
the processor, further configured to allocate a service channel of the second communications network to the user equipment; and
the transceiver circuit is specifically configured to send first Layer 3 signaling to the user equipment by using the first connection, wherein the first Layer 3 signaling is used to transfer the user equipment to the service channel of the second communications network allocated by the processor.

18. The single radio controller according to claim 10, wherein the transceiver circuit is further configured to send a measurement control message to the user equipment, wherein the measurement control message is used to instruct the user equipment to measure the second communications network; and receive a measurement report generated by the user equipment according to a result of the measurement.

19. The single radio controller according to claim 10, wherein the processor is specifically configured to generate at least one message to at least one component of the second communications network to manage radio resources thereof, based on the first NAS signaling or Layer 3 signaling of the second communications network received from the user equipment via the first connection.

20. The single radio controller according to claim 19, wherein the at least one message instructs the at least one component of the second communications network to allocate a service channel of the second communications network to the user equipment.

* * * * *